US012804648B2

(12) United States Patent
Li et al.

(10) Patent No.: US 12,804,648 B2
(45) Date of Patent: Nov. 17, 2026

(54) CROSS-CARRIER SCHEDULING WITH DIFFERENT CELL NUMEROLOGIES

(71) Applicant: Intel Corporation, Santa Clara, CA (US)

(72) Inventors: Yingyang Li, Beijing (CN); Yi Wang, Beijing (CN); Gang Xiong, Beaverton, OR (US); Daewon Lee, Portland, OR (US); Debdeep Chatterjee, San Jose, CA (US)

(73) Assignee: Intel Coporation, Santa Clara, CA (US)

( * ) Notice: Subject to any disclaimer, the term of this patent is extended or adjusted under 35 U.S.C. 154(b) by 197 days.

(21) Appl. No.: 18/283,066

(22) PCT Filed: Jul. 5, 2022

(86) PCT No.: PCT/US2022/036129
§ 371 (c)(1),
(2) Date: Sep. 20, 2023

(87) PCT Pub. No.: WO2023/283191
PCT Pub. Date: Jan. 12, 2023

(65) Prior Publication Data

US 2024/0188079 A1 Jun. 6, 2024

Related U.S. Application Data

(60) Provisional application No. 63/296,131, filed on Jan. 3, 2022, provisional application No. 63/246,264, filed on Sep. 20, 2021.

(30) Foreign Application Priority Data

Jul. 7, 2021 (WO) ................ PCT/CN2021/104966

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 27/26025* (2021.01);
(Continued)

(58) Field of Classification Search
CPC ... H04L 1/1812; H04L 1/1854; H04L 1/1861; H04L 1/1864; H04L 27/26025;
(Continued)

(56) References Cited

U.S. PATENT DOCUMENTS 10,813,137 B2 * 10/2020 Shih ...................... H04W 72/23
2015/0263796 A1 * 9/2015 Nam ..................... H04L 5/0094
370/329

(Continued)

FOREIGN PATENT DOCUMENTS

JP 2021523654 A 9/2021
JP 7872287 6/2026

(Continued)

OTHER PUBLICATIONS

"Japanese Application Serial No. 2023-558397, Voluntary Amendment Filed Jan. 14, 2025", w English Claims, 18 pgs.

(Continued)

*Primary Examiner* — Phuc H Tran
(74) *Attorney, Agent, or Firm* — Schwegman Lundberg & Woessner, P.A.

(57) ABSTRACT

A computer-readable storage medium stores instructions to configure a UE for cross-carrier scheduling of data transmissions in a 5G NR and beyond wireless network, and to cause the UE to perform operations including decoding configuration signaling received from a base station. The
(Continued)

configuration signaling indicates a first numerology parameter for a scheduling cell of the base station and a second numerology parameter for a scheduled cell of the base station. DCI is received via a PDCCH of the scheduling cell. The DCI schedules a DL data transmission in the scheduled cell of the base station. The DL data transmission is received via a PDSCH of the scheduled cell when a difference between the first numerology parameter and the second numerology parameter is smaller than or equal to a pre-configured numerology threshold value. The UE refrains from decoding the DL data transmission when the difference is greater than the threshold value.

17 Claims, 19 Drawing Sheets

(51) Int. Cl.
*H04L 27/26* (2006.01)
*H04W 72/0457* (2023.01)
*H04W 72/1268* (2023.01)
*H04W 72/232* (2023.01)

(52) U.S. Cl.
CPC ... *H04W 72/0457* (2023.01); *H04W 72/1268* (2013.01); *H04W 72/232* (2023.01)

(58) Field of Classification Search
CPC ..... H04L 5/001; H04L 5/0023; H04L 5/0028; H04L 5/0044; H04L 5/0055; H04L 5/0064; H04L 5/0092; H04L 5/1469; H04L 5/16; H04W 72/0453; H04W 72/0457; H04W 72/1268; H04W 72/1273; H04W 72/23; H04W 72/232
See application file for complete search history.

(56) References Cited

U.S. PATENT DOCUMENTS

2019/0199477 A1* 6/2019 Park .......................... H04L 5/00
2019/0357238 A1 11/2019 Zhou et al.
2020/0404667 A1* 12/2020 Khoshnevisan ...... H04L 5/0039
2021/0135791 A1* 5/2021 Wang .................... H04L 1/0075
2021/0136798 A1 5/2021 Ang et al.
2021/0136808 A1 5/2021 Yang et al.
2021/0204309 A1 7/2021 Babaei
2022/0329366 A1* 10/2022 Kim ...................... H04L 5/0055

FOREIGN PATENT DOCUMENTS

KR 20190088565 7/2019
WO WO-2019220595 A1 11/2019
WO WO-2021077137 A2 4/2021
WO WO-2023283191 A1 1/2023

OTHER PUBLICATIONS

"Korean Application Serial No. 10-2023-7033180 , Voluntary Amendment Filed Feb. 4, 2025", w English Claims, 24 pgs.
"International Application Serial No. PCT/US2022/036129, International Search Report mailed Oct. 17, 2022", 4 pgs.
"International Application Serial No. PCT/US2022/036129, Written Opinion mailed Oct. 17, 2022", 6 pgs.
"International Application Serial No. PCT/US2022/036129, International Preliminary Report on Patentability mailed Jan. 18, 2024", 8 pgs.
"Japanese Application Serial No. 2023-558397, Notification of Reasons for Refusal mailed Oct. 21, 2025", w/ English Translation, 11 pgs.
NTT DOCOMO, "PDSCH/PUSCH enhancements for NR from 52.6 to 71 GHz", 3GPP TSG RAN WG1 #105—eR1-2105690, [Online]. Retrieved from the Internet: <https://www.3gpp.org/ftp/tsg_ran/WG1_RL1/TSGR1_105-e/Docs/R1-2105690.zip>, (Jan. 21, 2005), 12 pgs.
"Japanese Application Serial No. 2023-558397, Response filed Jan. 20, 2026 to Notification of Reasons for Refusal mailed Oct. 21, 2025", W English Translation, 5 pgs.
"Korean Application Serial No. 10-2023-7033180, Notice of Preliminary Rejection mailed Aug. 7, 2026", w Machine English translation, 13 pgs.

* cited by examiner

CROSS-CARRIER SCHEDULING WITH DIFFERENT CELL NUMEROLOGIES

PRIORITY CLAIM

This application is a U.S. National Stage Filing under 35 U.S.C. 371 from International Application No. PCT/US2022/036129, filed Jul. 5, 2022 and published in English as WO 2023/283191 on Jan. 12, 2023, which claims the benefit of priority to the following patent applications:

International Application No. PCT/CN2021/104966, filed Jul. 7, 2021, and entitled "TIME BUNDLING FOR SEMI-STATIC HARQ-ACK CODEBOOK FOR MULTI-PDSCH SCHEDULING;"

U.S. Provisional Patent Application No. 63/246,264, filed Sep. 20, 2021, and entitled "TIME BUNDLING FOR SEMI-STATIC HARQ-ACK CODEBOOK FOR MULTI-PDSCH SCHEDULING;" and United States Provisional Patent Application No. 63/296,131, filed Jan. 3, 2022, and entitled "CROSS-CARRIER SCHEDULING WITH DIFFERENT NUMEROLOGIES OF THE SCHEDULING CELL AND THE SCHEDULED CELL."

Each of the above-listed patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks and beyond including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to mechanisms for time bundling for semi-static hybrid automatic repeat request acknowledgment (HARQ ACK) codebook for multi-physical downlink shared channel (multi-PDSCH) scheduling in 5G-NR and beyond network communications. Yet additional aspects are related to mechanisms for cross-carrier scheduling with different numerologies of the scheduling cell and the scheduled cell in 5G-NR and beyond networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G-NR (and beyond) systems. Such enhanced operations can include mechanisms for handling overlap between DL reception and UL transmission for HD-FDD multiplexing operations in 5G-NR and beyond network communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
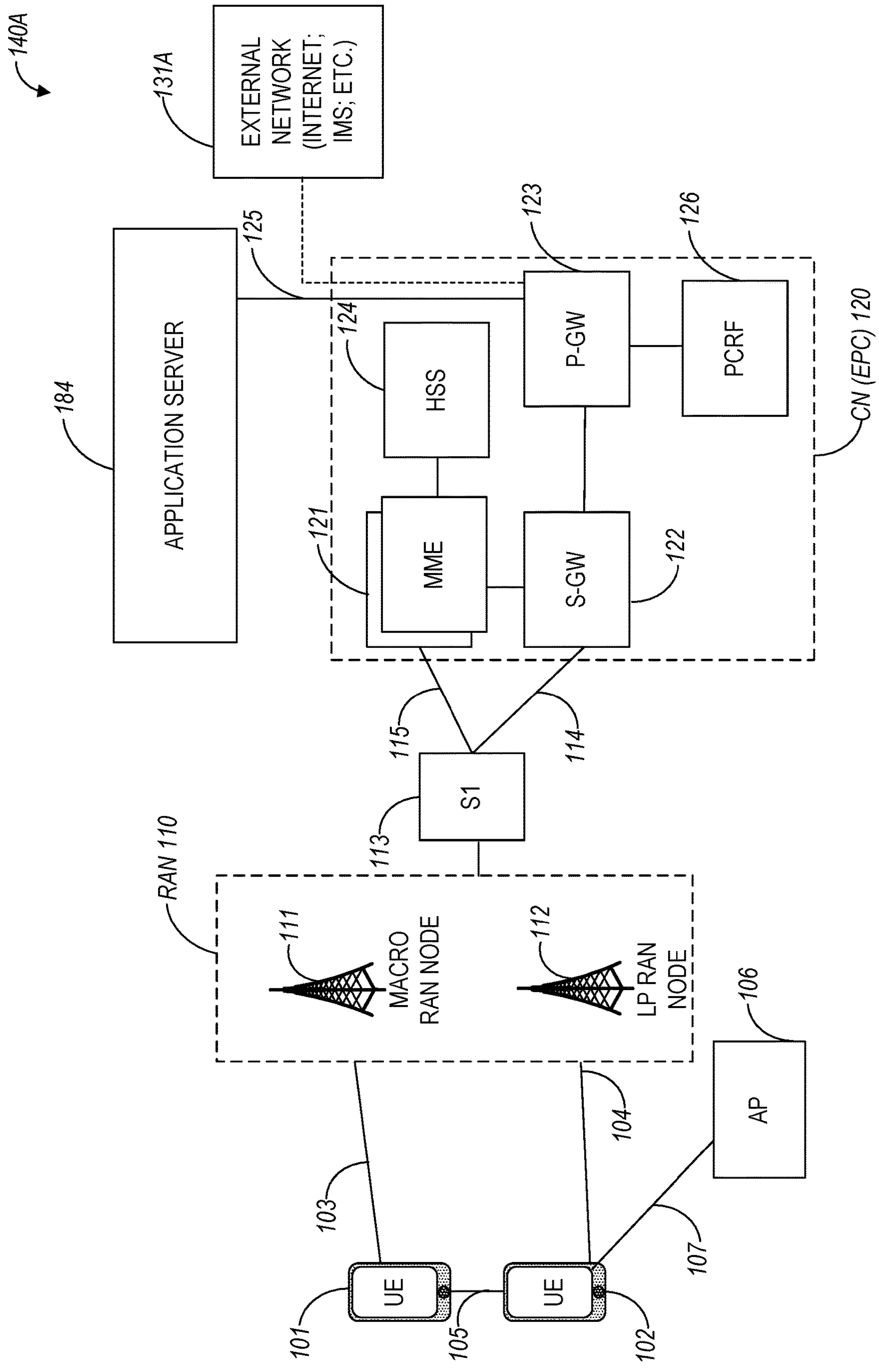
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHZ, 3.4-3.6 GHz, 3.6-3.8 GHz, and further frequencies and Spectrum Access System (SAS) in 3.55-3.7 GHZ and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IOT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IOT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. Connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IOT).

An NG system architecture can include the RAN 110 and a 5G core (5GC) network 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
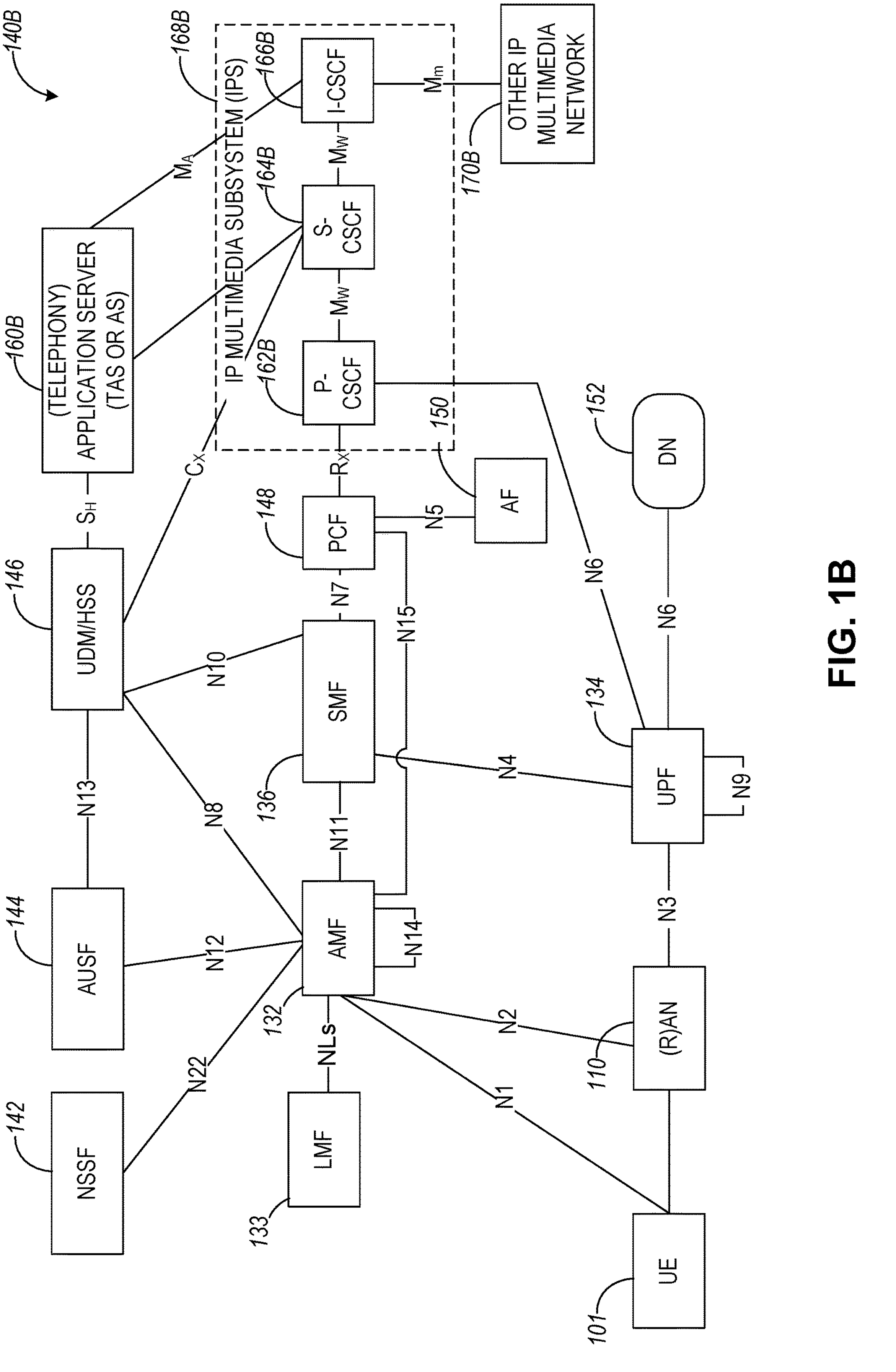
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server 160B, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
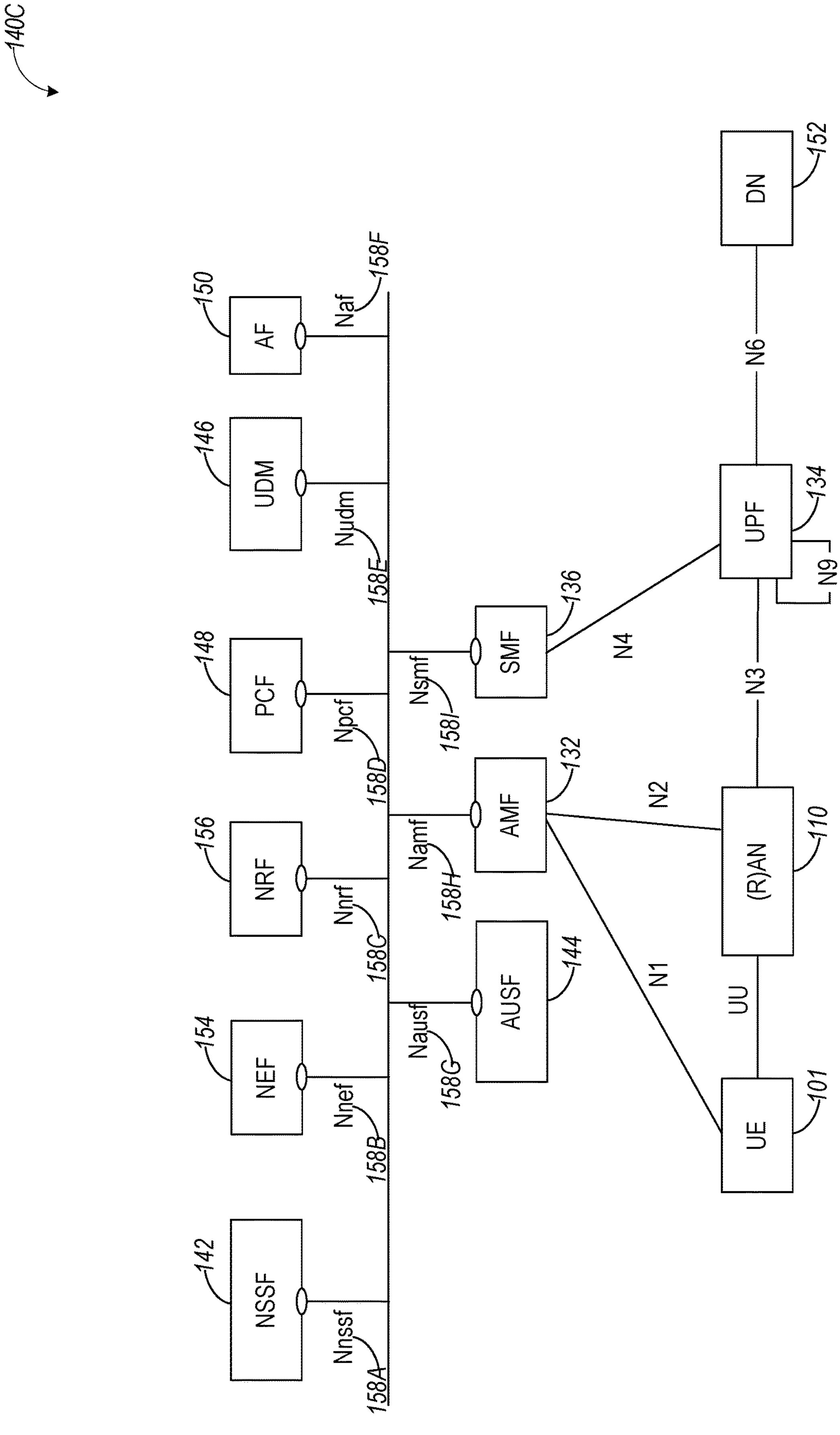

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) are not shown in FIG. 1C can also be used.

Figure 2:
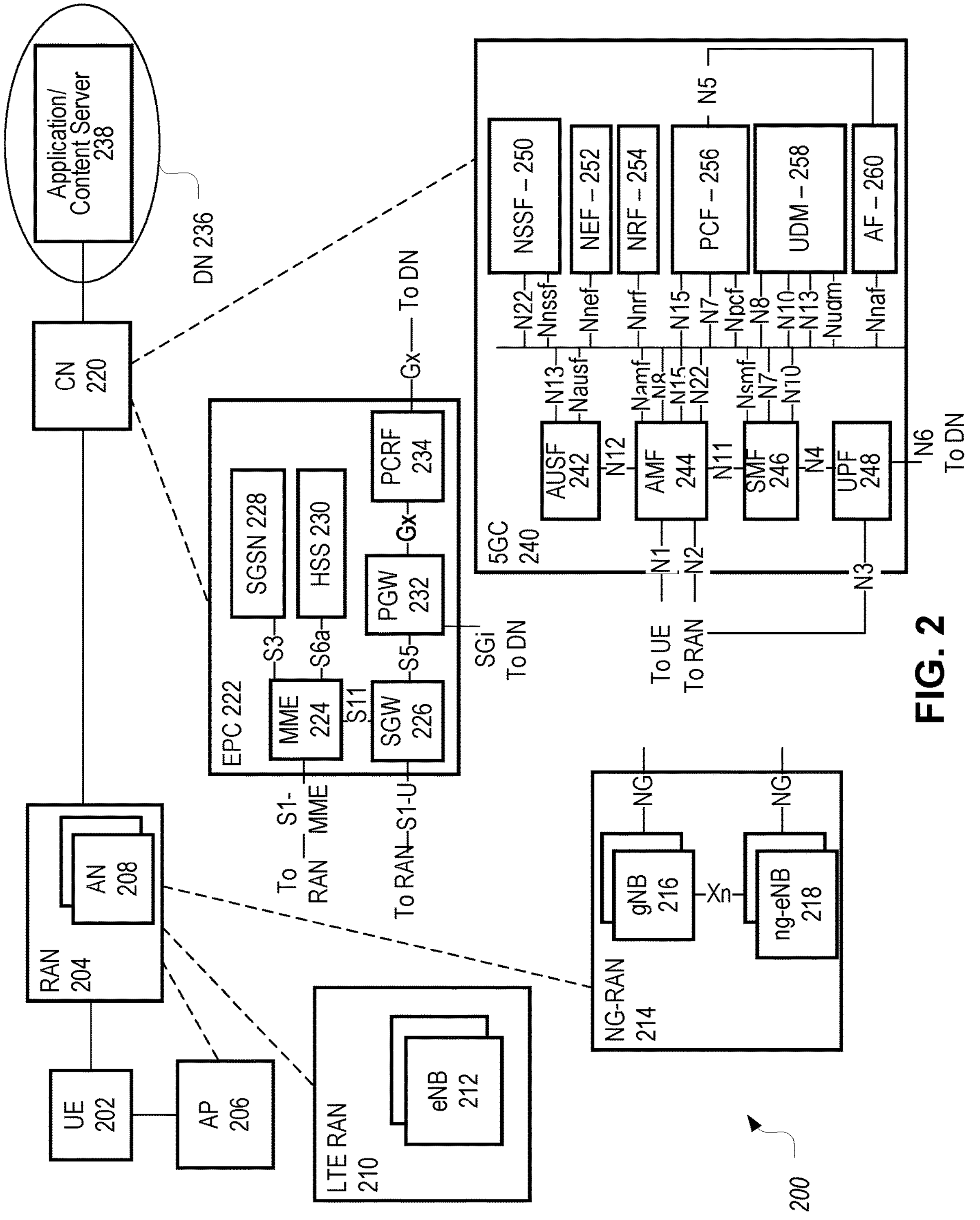
FIG. 2, FIG. 3, and FIG. 4 illustrate various systems, devices, and components that may implement aspects of disclosed embodiments.
Figure 3:
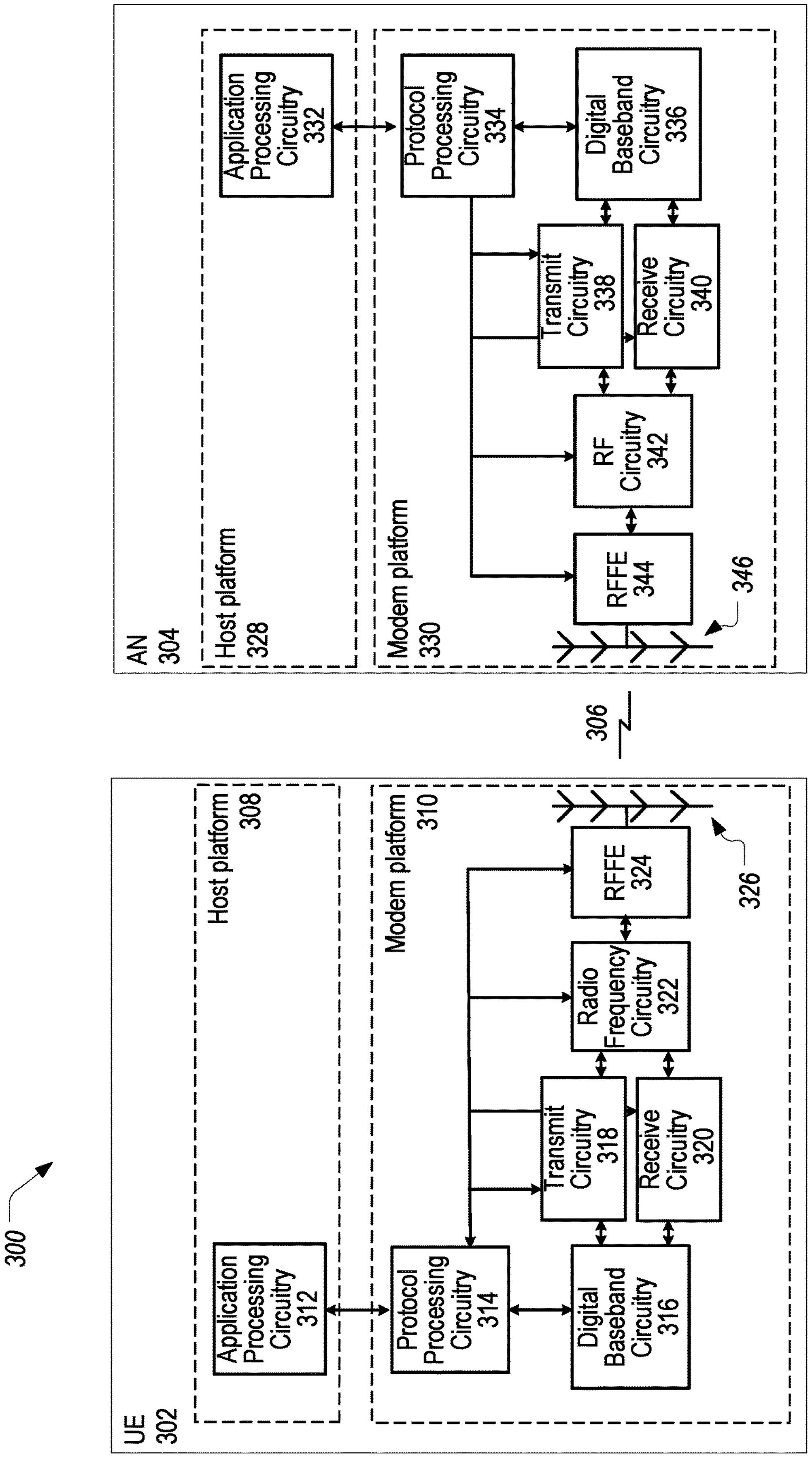
Figure 4:
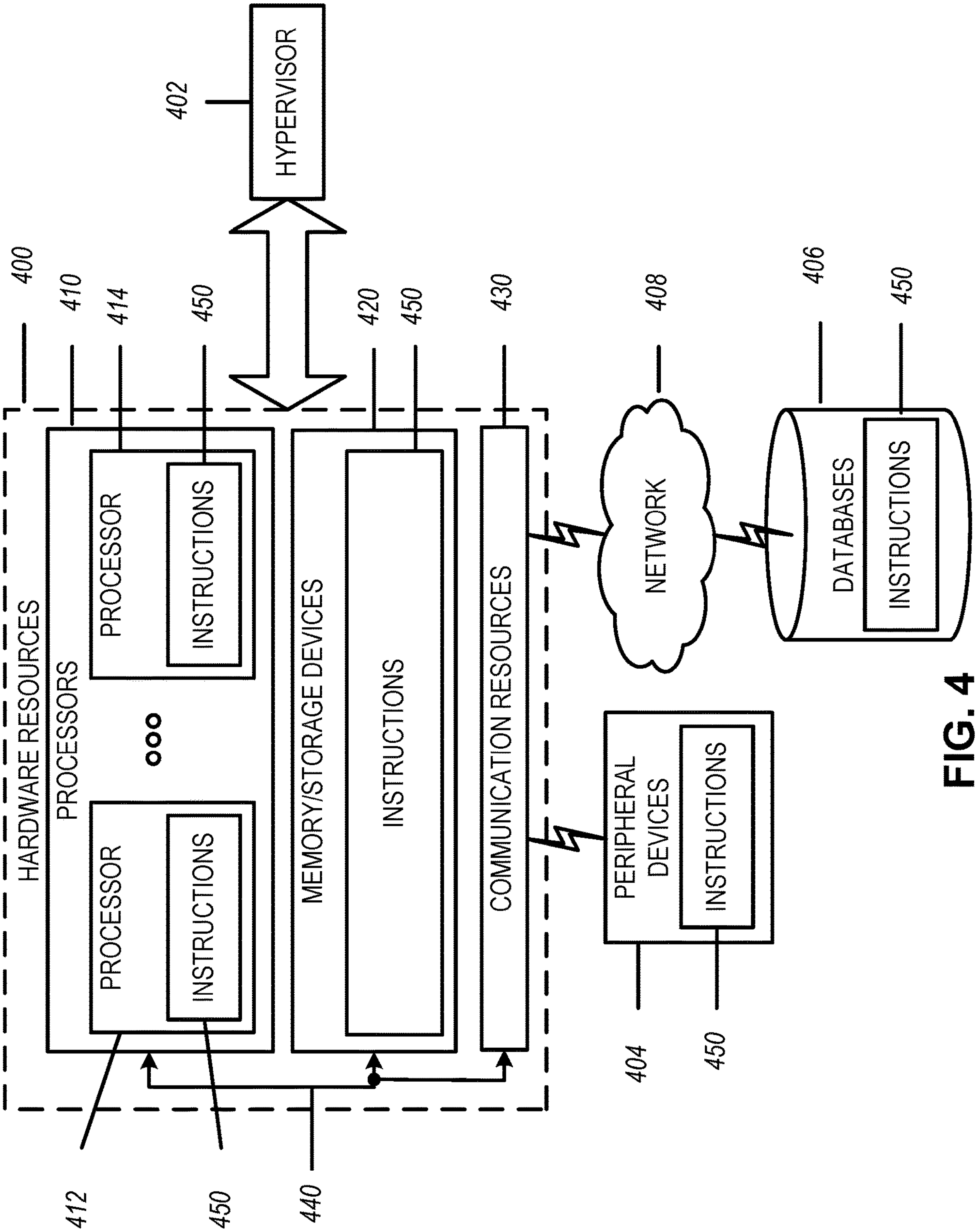

FIG. 2, FIG. 3, and FIG. 4 illustrate various systems, devices, and components that may implement aspects of disclosed embodiments in different communication systems, such as 5G-NR (and beyond) networks. UEs, base stations (such as gNBs), and/or other nodes (e.g., satellites or other NTN nodes) are discussed in connection with FIGS. 1A-4 can be configured to perform the disclosed techniques.

FIG. 2 illustrates a network 200 in accordance with various embodiments. Network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204.

The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a “UE-type RSU”; an eNB may be referred to as an “eNB-type RSU”; a gNB may be referred to as a “gNB-type RSU”; and the like. In one example, an RSU is a computing device coupled with radio frequency circuitry located on a roadside that provides connectivity support to passing vehicle UEs. The RSU may also include internal data storage circuitry to store intersection map geometry, traffic statistics, and media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point for interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine the allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, and application request information for multiple UEs 202) for the NEF 252. The Nudr service-based interface may be exhibited by the UDR to allow the UDM 258, PCF 256, and NEF 252 to access a particular set of stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318 receive circuitry 320, RF circuitry 322, RFFE 324, and antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

As defined in NR, one slot has 14 symbols. For a system operating above 52.6 GHz carrier frequency, if larger subcarrier spacing (SCS), e.g., 960 kHz is employed, the slot duration can be very short. For instance, for SCS 960 kHz, one slot duration is approximately 15.6 us as shown in FIG. 5

Figure 5:
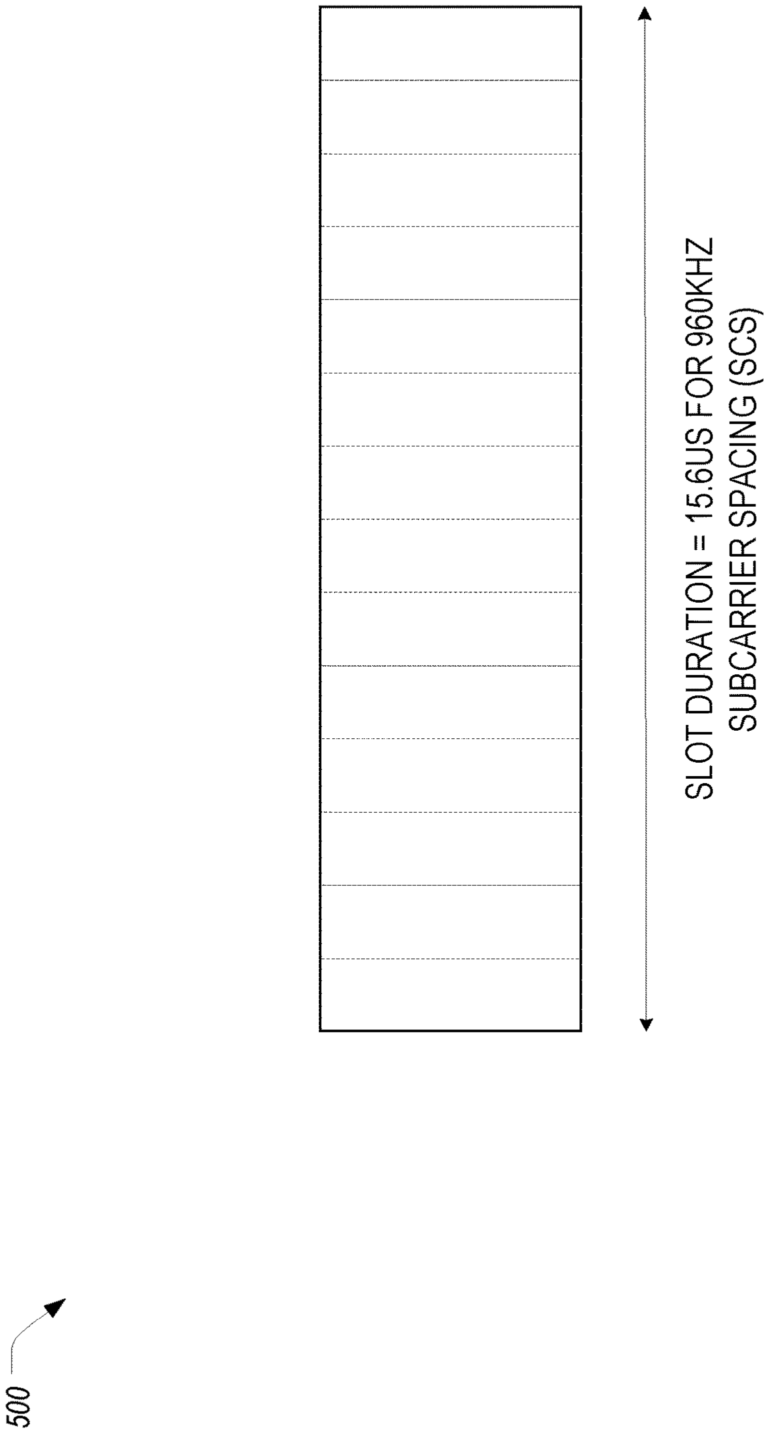
FIG. 5 illustrates a diagram of a short slot duration of larger subcarrier spacing, in accordance with some aspects.

FIG. 5 illustrates diagram 500 of the short slot duration of larger subcarrier spacing, in accordance with some aspects.

In NR, a control resource set (CORESET) is a set of time/frequency resources carrying PDCCH transmissions. The CORESET is divided into multiple control channel elements (CCEs). A physical downlink control channel (PDCCH) candidate with aggregation level (AL) L consists of L CCEs. L could be 1, 2, 4, 8, or 16. A search space set can be configured to a UE, which configures the timing for PDCCH monitoring and a set of CCEs carrying PDCCH candidates for the UE.

For carrier aggregation (CA) with cells in different frequency ranges (FRs), the difference in subcarrier spacing (SCS) on the active bandwidth parts (BWPs) of two cells can be very large. For example, the length of a slot with SCS 15 kHz is 64 times of a slot with SCS 960 kHz. If the scheduling cell and the scheduled cell respectively have SCS 15 kHz and 960 kHz in cross-carrier scheduling (CCS), the number of processed PDCCHs for the scheduled cell per scheduling cell slot has to be increased to a large number for flexible scheduling. In this case, a certain restriction may be applied for the difference in the subcarrier spacing between the scheduling cell and scheduled cell when CCS is applied.

The disclosed techniques can be used for handling e cross-carrier scheduling when the scheduling cell and the scheduled cell(s) have a large difference in the numerologies in a system operating above 52.6 GHz carrier frequency.

In some aspects, for CA with cells in different frequency ranges (FRs), the difference of SCS on the active BWPs of two cells can be very large. For example, the length of a slot with SCS 15 kHz is 64 times of a slot with SCS 960 kHz. If the scheduling cell and the scheduled cell respectively have SCS 15 kHz and 960 kHz in cross-carrier scheduling (CCS), the number of processed PDCCHs for the scheduled cell per scheduling cell slot has to be increased to a large number for flexible scheduling. However, the increase of processed PDCCHs on the scheduling cell results in high UE complexity. Therefore, it can be considered to have restrictions on the difference between the SCSs of the scheduling cell and the scheduled cell. Denote the SCS of the current active BWP on scheduling cell and scheduled cell as $2^{\mu_{DCI}} \cdot 15$ kHz and $2^{\mu_{DATA}} \cdot 15$ kHz respectively. The restriction could be $|\mu_{DCI} - \mu_{DATA}| \leq d_{max}$. For example, $d_{max}$ can be 3, 4, or 5. A UE does not expect that $|\mu_{DCI} - H_{DATA}| > d_{max}$ for CCS. In some aspects, $\mu_{DCI}$ is the numerology used in a primary (e.g., scheduling) cell, and $\mu_{DATA}$ is the numerology used in a secondary (e.g., scheduled) cell of a base station.

In some aspects, with the restriction of $|\mu_{DCI}-\mu_{DATA}|\le d_{max}$, it is possible that for the configured scheduling cell and a configured scheduled cell, CCS is applicable for some combinations of BWPs of the scheduling cell and the scheduled cell. However, CCS is not applicable in other combinations of BWPs of the scheduling cell and the scheduled cell. When CCS is configured, the scheduling cell is a scheduled cell that is scheduled by the scheduling cell too. A solution to handle the inapplicable combinations of BWPs of the scheduling cell and the scheduled cell can be configured using the disclosed techniques.

In some embodiments, for an active BWP with numerology $\mu_{DCI}$ on the scheduling cell, a BWP with numerology $\mu_{DATA,1}$ on a scheduled cell, if activated, may result in $|\mu_{DCI}-\mu_{DATA,1}|>d_{max}$. The BWP switching for the scheduled cell could be indicated by the BWP indicator field in a DCI or triggered by a timer, e.g. bwp-Inactivity Timer unless a dedicated restriction is explicitly captured. The DCI may be a DCI for single-cell PDSCH/PUSCH scheduling or a DCI for multi-cell PDSCH/PUSCH scheduling.

In some aspects, a UE does not expect that the active BWP on the scheduled cell is changed to a BWP with numerology $\mu_{DATA,1}$, which results in $|\mu_{DCI}-\mu_{DATA,1}|>d_{max}$. In this option, only a subset of configured BWPs on the scheduled cell can be used for CCS from the scheduling cell.

In some aspects, if the active BWP on the scheduled cell is changed to a first BWP with numerology $\mu_{DATA,1}$ which results in $|\mu_{DCI}-\mu_{DATA,1}|>d_{max}$, the scheduled cell is not available for dynamically scheduled PDSCH/PUSCH transmission until the active BWP on the scheduling cell and/or the scheduled cell is changed to a BWP which satisfies $|\mu_{DCI,1}-\mu_{DATA,2}|\le d_{max}$. $\mu_{DCI,1}$ is the numerology of the new active BWP on the scheduling cell if the active BWP is switched, otherwise $\mu_{DCI,1}$ is the numerology of the currently active BWP of the scheduling cell. $\mu_{DATA,2}$ is the numerology of the new active BWP on the scheduled cell if the active BWP is switched, otherwise $\mu_{DATA,2}$ is the numerology of the currently active BWP of the scheduled cell. In this option, the UE may still transmit or receive high-layer configured signals/channels on the first BWP. Alternatively, the UE may not transmit or receive any signal/channel on the first BWP.

Figure 6:
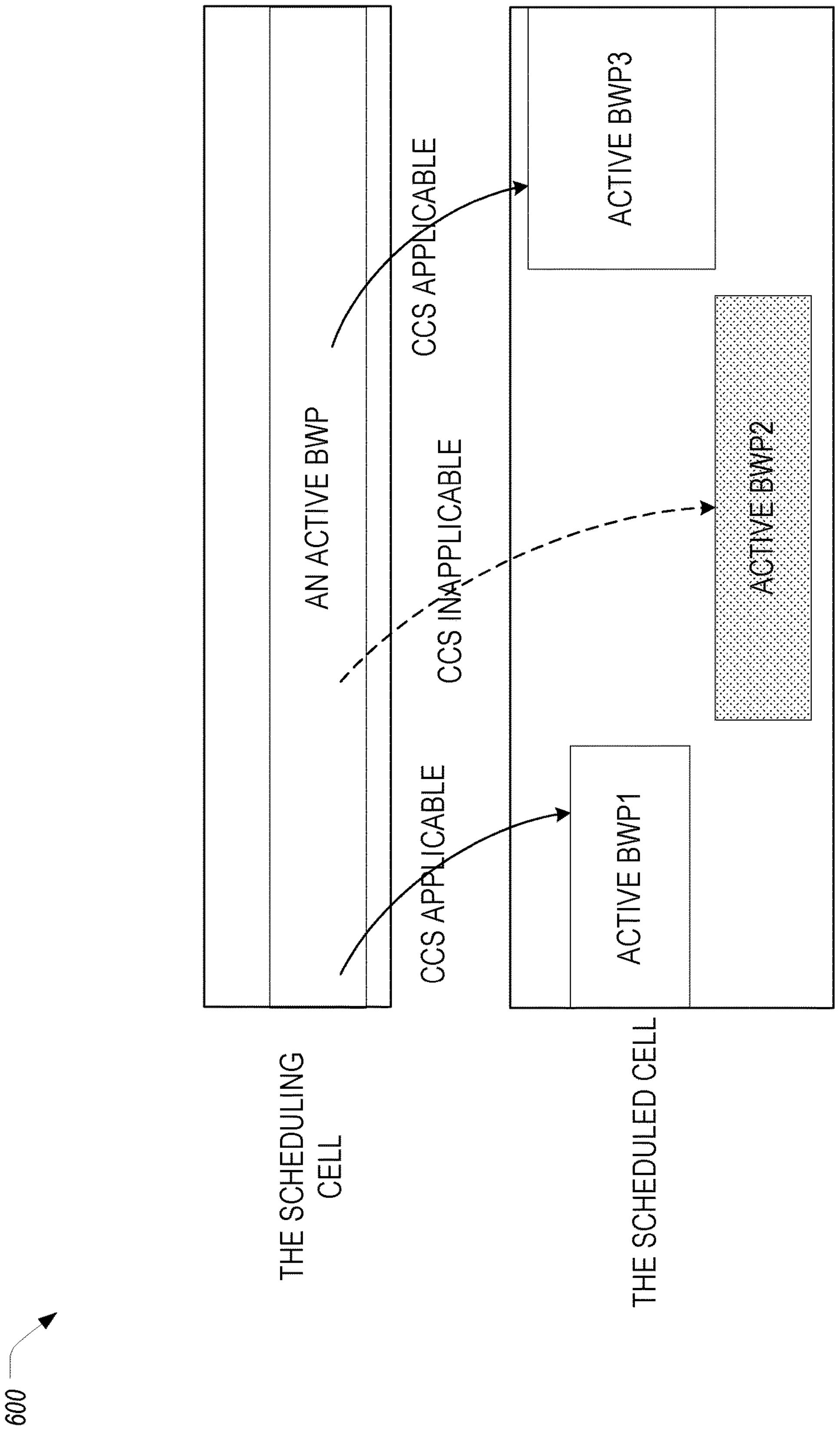
FIG. 6 illustrates a diagram of cross-carrier scheduling when the scheduled cell becomes inapplicable, in accordance with some aspects.

FIG. 6 illustrates diagram 600 of cross-carrier scheduling when the scheduled cell becomes inapplicable, in accordance with some aspects. More specifically, FIG. 6 illustrates an example when the scheduled cell becomes not schedulable for cross-carrier scheduling when it switches to BWP2 which results in $|\mu_{DCI}-\mu_{DATA,1}|>d_{max}$.

In some aspects, if the BWP indicator field in a DCI indicates a BWP with numerology $\mu_{DATA,1}$ on the scheduled cell which results in $|\mu_{DCI}-\mu_{DATA,1}|>d_{max}$, the UE neglects the BWP indicator field and does not change BWP for the scheduled cell. The UE can interpret the DCI as scheduling a PDSCH or PUSCH on the current active BWP of the scheduled cell. Alternatively, the UE neglects the DCI.

In some embodiments, if the BWP indicator field in a DCI indicates a BWP with numerology $\mu_{DATA,1}$ on the scheduled cell which results in $|\mu_{DCI}-\mu_{DATA,1}|>d_{max}$, the UE automatically switches to a BWP with numerology $\mu_{DATA,2}$ which satisfies $|\mu_{DCI}-\mu_{DATA,2}|\le d_{max}$. The automatically switched BWP on the scheduled cell could be the default BWP, the first active BWP after SCell activation, or the dormant BWP, a separately configured BWP by high layer signaling. Alternatively, the automatically switched BWP could be respectively configured depending on an active BWP of the scheduling cell. Alternatively, the automatically switched BWP could be respectively configured for each BWP of the scheduled cell. Alternatively, the automatically switched BWP for each BWP of the scheduled cell could be respectively configured depending on an active BWP of the scheduling cell. In some aspects, it can be up to gNB implementation to guarantee that the automatically switched BWP on the scheduled cell meets $|\mu_{DCI}-\mu_{DATA,2}|\le d_{max}$. The UE can interpret the DCI as scheduling a PDSCH or PUSCH on the automatically switched BWP of the scheduled cell.

In some aspects, if the active BWP on the scheduled cell is changed to a BWP with numerology $\mu_{DATA,1}$ which results in $|\mu_{DCI}-\mu_{DATA,1}|>d_{max}$, self-scheduling applies to the BWP on the scheduled cell. The search space (SS) sets for self-scheduling on the BWP of the scheduled cell can be separately configured from the SS sets for cross-carrier scheduling. A SS set for self-scheduling is only monitored by the UE in case $|\mu_{DCI}-\mu_{DATA,1}|>d_{max}$.

In some aspects, for an active BWP with numerology $\mu_{DATA}$ on a scheduled cell, a BWP with numerology $\mu_{DCI,1}$ on the scheduling cell, if activated, may result in $|\mu_{DCI,1}-\mu_{DATA}|>d_{max}$. The BWP switching for the scheduling cell could be indicated by the BWP indicator field in a DCI or triggered by a timer, e.g., bwp-Inactivity Timer unless a dedicated restriction is explicitly captured. The DCI may be a DCI for single-cell PDSCH/PUSCH scheduling or a DCI for multi-cell PDSCH/PUSCH scheduling.

In some embodiments, the UE does not expect that the active BWP on the scheduling cell is changed to a BWP with numerology $\mu_{DCI,1}$ which results in $|\mu_{DCI,1}-\mu_{DATA}|>d_{max}$ for any configured or activated scheduled cell or for any currently scheduled cell. In this option, only a subset of configured BWPs on the scheduling cell can be used for CCS from the scheduling cell.

In some embodiments, if the active BWP on the scheduling cell is changed to a BWP with numerology $\mu_{DCI,1}$ which results in $|\mu_{DCI,1}-\mu_{DATA}|>d_{max}$ for a configured or activated scheduled cell or for a currently scheduled cell or for a scheduled cell that is not scheduled currently, the scheduled cell is not available for dynamically scheduled PDSCH/PUSCH transmission until the active BWP on the scheduling cell and/or the scheduled cell is changed to a BWP which satisfies $|\mu_{DCI,2}-\mu_{DATA,1}|\le d_{max}$. $\mu_{DCI,2}$ is the numerology of the new active BWP on the scheduling cell if the active BWP is to be switched, otherwise $\mu_{DCI,2}$ is the numerology of the currently active BWP of the scheduling cell. $\mu_{DATA,1}$ is the numerology of the new active BWP on the scheduled cell if the active BWP is to be switched, otherwise $\mu_{DATA,1}$ is the numerology of the currently active BWP of the scheduled cell. In this option, the UE may still transmit or receive high-layer configured signals/channels on the active BWP of the scheduled cell which results in $|\mu_{DCI,1}-\mu_{DATA}|>d_{max}$. Alternatively, the UE may not transmit or receive any signal/channel on the active BWP of the scheduled cell which results in $|\mu_{DCI,1}-\mu_{DATA}|>d_{max}$.

In some embodiments, if the active BWP on the scheduling cell is changed to a BWP with numerology $\mu_{DCI,1}$, which results in $|\mu_{DCI,1}-\mu_{DATA}|>d_{max}$ for a configured or activated scheduled cell or a currently scheduled cell or for a scheduled cell that is not scheduled currently, the UE neglects the BWP indicator field and does not change BWP for the scheduling cell. For a currently scheduled cell that meets $|\mu_{DCI,1}-\mu_{DATA}|\le d_{max}$, the UE may process the PDSCH or PUSCH transmission on the scheduled cell. Alternatively, the UE neglects the DCI.

In another option, if the active BWP on the scheduling cell is changed to a BWP with numerology $\mu_{DCI,1}$, which results in $|\mu_{DCI,1}-\mu_{DATA}|>d_{max}$ for a configured or activated scheduled cell or for a currently scheduled cell or for a scheduled cell that is not scheduled currently, the scheduled cell is automatically switched to a BWP with numerology $\mu_{DATA,1}$ which satisfies $|\mu_{DCI,1}-\mu_{DATA,1}|\leq d_{max}$. The automatically switched BWP on the scheduled cell could be the default BWP, the first active BWP after SCell activation, the dormant BWP, or a separately configured BWP by high layer signaling. Alternatively, the automatically switched BWP could be respectively configured depending on an active BWP of the scheduling cell. Alternatively, the automatically switched BWP could be respectively configured for each BWP of the scheduled cell. Alternatively, the automatically switched BWP for each BWP of the scheduled cell could be respectively configured depending on an active BWP of the scheduling cell. It is up to gNB implementation to guarantee that the automatically switched BWP on the scheduled cell meets $|\mu_{DCI,1}-\mu_{DATA,1}|\leq d_{max}$.

Figure 7:
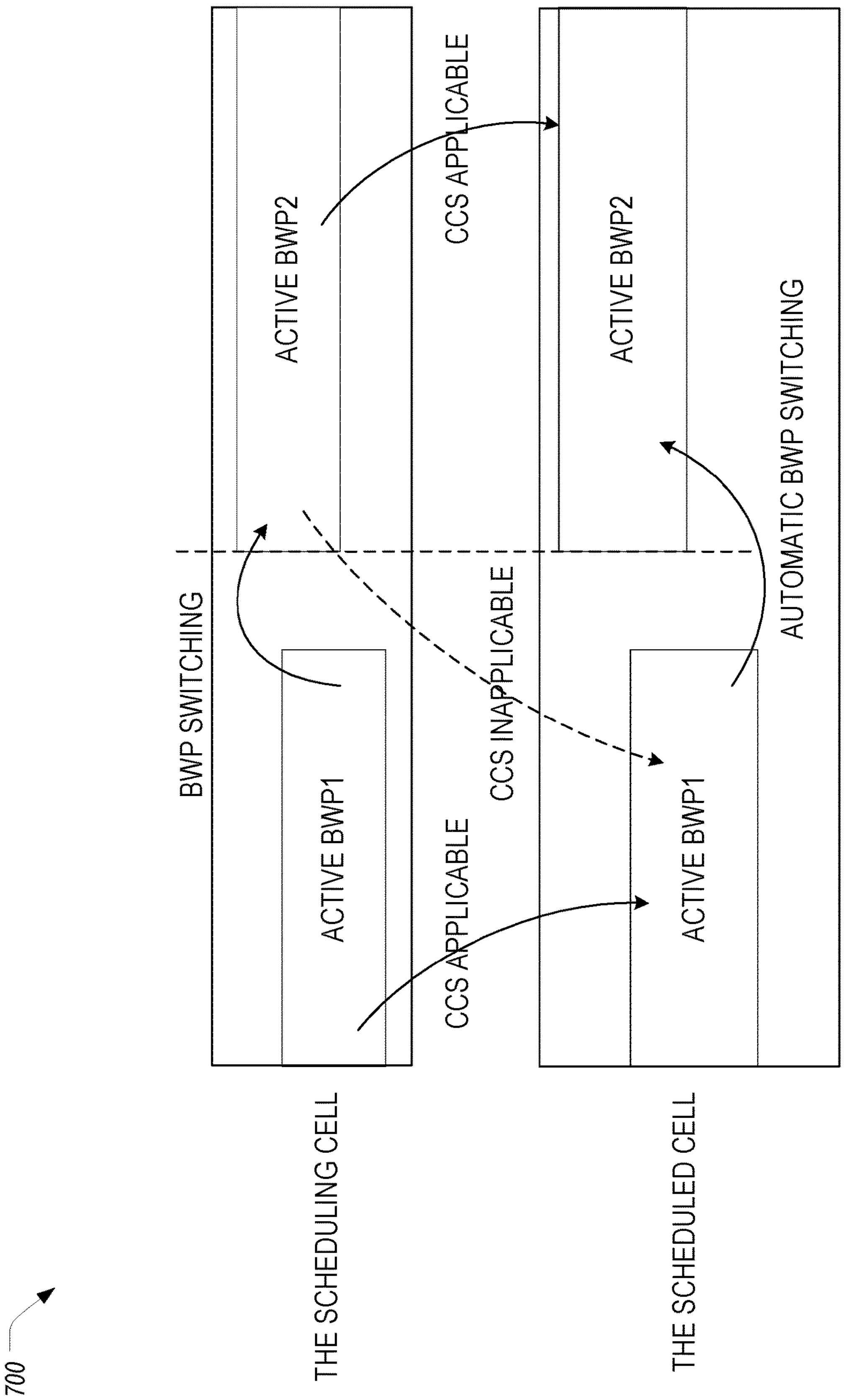
FIG. 7 illustrates a diagram of automatic bandwidth part (BWP) switching on the scheduled cell, in accordance with some aspects.

FIG. 7 illustrates diagram 700 of automatic bandwidth part (BWP) switching on the scheduled cell, in accordance with some aspects. More specifically, FIG. 7 illustrates an example when the scheduled cell can automatically change to a BWP, i.e., BWP2 on the scheduled cell which satisfies $|\mu_{DCI,1}-\mu_{DATA,1}|\leq d_{max}$ if the active BWP on the scheduling cell is switched from BWP1 to BWP2.

In some embodiments, if the active BWP on the scheduling cell is changed to a BWP with numerology $\mu_{DCI,1}$, which results in $|\mu_{DCI,1}-\mu_{DATA}|>d_{max}$ for a configured or activated scheduled cell or for a currently scheduled cell or for a scheduled cell that is not scheduled currently, self-scheduling applies to the BWP on the scheduled cell. The search space sets for self-scheduling on the BWP of the scheduled cell can be separately configured from the SS sets for cross-carrier scheduling. A SS set for self-scheduling is only monitored by the UE in case $|\mu_{DCI,1}-\mu_{DATA}|>d_{max}$.

In some aspects, in multi-cell PDSCH/PUSCH scheduling, a BWP on the scheduling cell and/or the scheduled cell, if activated, may result in $|\mu_{DCI,1}-\mu_{DATA,1}|>d_{max}$. $\mu_{DCI,1}$ is the numerology of the BWP on the scheduling cell after BWP switching if the BWP indicator in the DCI indicates a BWP different from the active BWP on the scheduling cell, otherwise $\mu_{DCI,1}$ is numerology of the currently active BWP of the scheduling cell. $\mu_{DATA,1}$ is the numerology of the BWP on the scheduled cell after BWP switching if the BWP indicator in the DCI indicates a BWP different from the active BWP on the scheduled cell, otherwise $\mu_{DATA,1}$ is numerology of currently active BWP of the scheduled cell. A DCI format for multi-cell scheduling can schedule PDSCH or PUSCH transmissions on multiple cells. The BWP switching for the scheduling cell or the scheduled cell could be indicated by the BWP indicator field in a DCI or triggered by a timer, e.g., bwp-Inactivity Timer unless a dedicated restriction is explicitly captured.

In some embodiments, the UE does not expect that the BWP indicator in the DCI indicates a BWP on the scheduling cell and/or a scheduled cell which results in $|\mu_{DCI,1}-\mu_{DATA,1}|>d_{max}$ for any configured or activated scheduled cell or for any currently scheduled cell by the DCI.

In some aspects, if the BWP indicator in the DCI indicates a BWP on the scheduling cell and/or a scheduled cell which results in $|\mu_{DCI,1}-\mu_{DATA,1}|>d_{max}$ for any configured or activated scheduled cell or for any currently scheduled cell by the DCI or for a scheduled cell that is not scheduled currently, the scheduled cell is not available for dynamically scheduled PDSCH/PUSCH transmission until the active BWP on the scheduling cell and/or the scheduled cell is changed to a BWP which satisfies $|\mu DCI,2-\mu_{DATA,2}|\leq d_{max}$. $\mu_{DCI,2}$ is the numerology of the new active BWP on the scheduling cell if the active BWP is to be switched, otherwise $\mu_{DCI,2}$ is the numerology of the currently active BWP of the scheduling cell. $\mu_{DATA,2}$ is the numerology of the new active BWP on the scheduled cell if the active BWP is to be switched, otherwise $\mu_{DATA,2}$ is the numerology of the currently active BWP of the scheduled cell. In this aspect, the UE may still transmit or receive high layer configured signals/channels on the active BWP of the scheduled cell which results in $|\mu_{DCI,1}-\mu_{DATA,1}|>d_{max}$. Alternatively, the UE may not transmit or receive any signal/channel on the active BWP of the scheduled cell which results in $\mu_{DCI,1}-\mu_{DATA,1}|>d_{max}$.

In some aspects, if the BWP indicator in the DCI indicates a BWP on the scheduling cell and/or a scheduled cell which results in $|\mu_{DCI,1}-\mu_{DATA,1}|>d_{max}$ for any configured or activated scheduled cell or for any currently scheduled cell by the DCI or for a scheduled cell that is not scheduled currently, the UE neglects the BWP indicator field and does not change BWP for the scheduling cell and/or the scheduled cell. The UE can interpret the DCI as scheduling a PDSCH or PUSCH on the current active BWP of the scheduling cell and/or the scheduled cell. For a currently scheduled cell that meets $|\mu_{DCI,1}-\mu_{DATA,1}|\leq d_{max}$, the UE may process the PDSCH or PUSCH transmission on the scheduled cell. Alternatively, the UE ignores the DCI.

In another aspect, if the BWP indicator in the DCI indicates a BWP on the scheduling cell and/or a scheduled cell which results in $|\mu_{DCI,1}-\mu_{DATA,1}|>d_{max}$ for any configured or activated scheduled cell or for any currently scheduled cell by the DCI or for a scheduled cell that is not scheduled currently, the scheduled cell is automatically switched to a BWP with numerology $\mu_{DATA,2}$ which satisfies $|\mu_{DCI,1}-\mu_{DATA,2}\leq d_{max}$. The automatically switched BWP on the scheduled cell could be the default BWP, the first active BWP after SCell activation, the dormant BWP, a separately configured BWP by high layer signaling. Alternatively, the automatically switched BWP could be respectively configured for each BWP of the scheduled cell. Alternatively, the automatically switched BWP could be respectively configured depending on an active BWP of the scheduling cell. It is up to gNB implementation to guarantee that the automatically switched BWP of the scheduled cell meets $|\mu_{DCI,1}-\mu_{DATA,2}|\leq d_{max}$.

In another option, if the active BWP on the scheduling cell and/or the scheduled cell is changed which results in $|\mu_{DCI,1}-\mu_{DATA,1}|>d_{max}$ for a configured or activated scheduled cell or for a currently scheduled cell or for a scheduled cell that is not scheduled currently, self-scheduling applies to the BWP on the scheduled cell. The search space sets for self-scheduling on the BWP of the scheduled cell can be separately configured from the SS sets for cross-carrier scheduling. A SS set for self-scheduling is only monitored by the UE in case $|\mu_{DCI,1}-\mu_{DATA,1}|>d_{max}$.

In some embodiments, a system and a method of wireless communication for cross-carrier scheduling of DL or UL transmission include the disclosed techniques. For example, the UE detects a PDCCH that is transmitted on the active BWP of a scheduling cell. The UE transmits a PUSCH or receives a PDSCH based on the PDCCH on the active BWP on a scheduled cell if $|\mu_{DCI}-\mu_{DATA}|\leq d_{max}$, where the SCS of the active BWP on scheduling cell and scheduled cell are $2^{\mu_{DCI}}\cdot 15$ kHz and $2^{\mu_{DATA}}\cdot 15$ kHz respectively.

In some aspects, a BWP on a scheduled cell, if activated, results in $|\mu_{DCI}-\mu_{DATA}|>d_{max}$. In some embodiments, the UE does not expect that the active BWP on the scheduled cell is changed to a BWP with numerology $\mu_{DATA,1}$ which results in $|\mu_{DCI}-\mu_{DATA,1}|>d_{max}$. In some embodiments, if the active BWP on the scheduled cell is changed to a first BWP with numerology $\mu_{DATA,1}$ which results in $|\mu_{DCI}-\mu_{DATA,1}|>d_{max}$, the scheduled cell is not available for dynamically scheduled PDSCH/PUSCH transmission on the first BWP.

In some embodiments, if the BWP indicator field in a DCI indicates a BWP with numerology $\mu_{DATA,1}$ on the scheduled cell which results in $|\mu_{DCI}-\mu_{DATA,1}|>d_{max}$, the UE does not change BWP for the scheduled cell.

In some aspects, if the BWP indicator field in a DCI indicates a BWP with numerology $\mu_{DATA,1}$ on the scheduled cell which results in $|\mu_{DCI}-\mu_{DATA,1}|>d_{max}$, the UE automatically switches to a BWP with numerology $\mu_{DATA,2}$ which satisfies $|\mu_{DCI}-\mu_{DATA,2}|\leq d_{max}$. In some aspects, if the active BWP on the scheduled cell is changed to a BWP with numerology $\mu_{DATA,1}$, which results in $|\mu_{DCI}-\mu_{DATA,1}|>d_{max}$, self-scheduling applies to the BWP on the scheduled cell.

In some embodiments, a BWP on the scheduling cell, if activated, results in $|\mu_{DCI}-\mu_{DATA}|>d_{max}$. In some aspects, the UE does not expect that the active BWP on the scheduling cell is changed to a BWP with numerology $\mu_{DCI,1}$ which results in $|\mu_{DCI,1}-\mu_{DATA}|>d_{max}$ for any scheduled cell. In some aspects, if the active BWP on the scheduling cell is changed to a first BWP with numerology $\mu_{DCI,1}$ which results in $|\mu_{DCI,1}-\mu_{DATA}|>d_{max}$ for a scheduled cell, the scheduled cell is not available for dynamically scheduled PDSCH/PUSCH transmission on the first BWP.

In some aspects, in a DCI for self-scheduling of the scheduling cell, if the DCI indicates an active BWP with numerology $\mu_{DCI,1}$ on the scheduling cell which results in $|\mu_{DCI,1}-\mu_{DATA}|>d_{max}$ for a scheduled cell, the UE neglects the BWP indicator field and does not change BWP for the scheduling cell. In some aspects, if the active BWP on the scheduling cell is changed to a BWP with numerology $\mu_{DCI,1}$, which results in $|\mu_{DCI,1}-\mu_{DATA}|>d_{max}$ for a scheduled cell, the scheduled cell is automatically switched to a BWP with numerology $\mu_{DATA,1}$ which satisfies $|\mu_{DCI,1}-\mu_{DATA,1}|\leq d_{max}$.

In some aspects, if the active BWP on the scheduling cell is changed to a BWP with numerology $\mu_{DCI,1}$, which results in $|\mu_{DCI,1}-\mu_{DATA}|>d_{max}$ for a scheduled cell, self-scheduling applies to the BWP on the scheduled cell.

In some embodiments, in multi-cell PDSCH/PUSCH scheduling, a BWP on the scheduling cell and/or the scheduled cell, if activated, results in $|\mu_{DCI,1}-\mu_{DATA,1}|>d_{max}$. In some aspects, the UE does not expect that the BWP indicator in the DCI indicates a BWP on the scheduling cell and/or a scheduled cell which results in $|\mu_{DCI,1}-\mu_{DATA,1}|>d_{max}$ for any scheduled cell.

In some embodiments, if the BWP indicator in the DCI indicates a first BWP on the scheduling cell and/or a scheduled cell which results in $|\mu_{DCI,1}-\mu_{DATA,1}|>d_{max}$ for a scheduled cell, the scheduled cell is not available for dynamically scheduled PDSCH/PUSCH transmission on the first BWP. In some aspects, if the BWP indicator in the DCI indicates a BWP on the scheduling cell and/or a scheduled cell which results in $|\mu_{DCI,1}-\mu_{DATA,1}|>d_{max}$ for a scheduled cell, the UE does not change BWP for the scheduling cell and/or the scheduled cell. In some aspects, if the BWP indicator in the DCI indicates a BWP on the scheduling cell and/or a scheduled cell which results in $|\mu_{DCI,1}-\mu_{DATA,1}|>d_{max}$ for a scheduled cell, the scheduled cell is automatically switched to a BWP with numerology $\mu_{DATA,2}$ which satisfies $|\mu_{DCI,1}-\mu_{DATA,2}|>d_{max}$. In some embodiments, if the active BWP on the scheduling cell and/or the scheduled cell is changed resulting in $|\mu_{DCI,1}-\mu_{DATA,1}|>d_{max}$ for a scheduled cell, self-scheduling applies to the BWP on the scheduled cell.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR evolves based on 3GPP LTE-Advanced with additional potential new Radio Access Technologies (RATs) to enrich people's lives with better, simple, and seamless wireless connectivity solutions. NR can enable everything connected by wireless and deliver fast, rich content and services.

In NR, HARQ-based PDSCH transmission can be adopted. A gNB schedules a PDSCH transmission by transmitting a DCI. The PDSCH transmission carries only one TB if the number of MIMO layers is no more than 4. Otherwise, two TBs are transmitted. The UE detects the DCI, decodes the PDSCH, and then reports HARQ-ACK information to the gNB. Consequently, the gNB may schedule a new transport block (TB) or retransmission of the previous TB depending on the HARQ-ACK information from the UE.

For the Type1 HARQ-ACK codebook in NR, a set of occasions for candidate PDSCH reception are determined based on the configured set of slot timing values K1, the configured time division duplex (TDD) UL-DL configurations (i.e., TDD UL-DL configurationCommon and TDD UL-DL configurationDedicated) and the time domain resource allocation (i.e. start and length indicator value or SLIV) table(s). Depending on the UE capability, the number of occasions for a slot associated with a value n-K1 is either up to 1 or determined by non-overlapped SLIVs in the slot.

Figure 8:
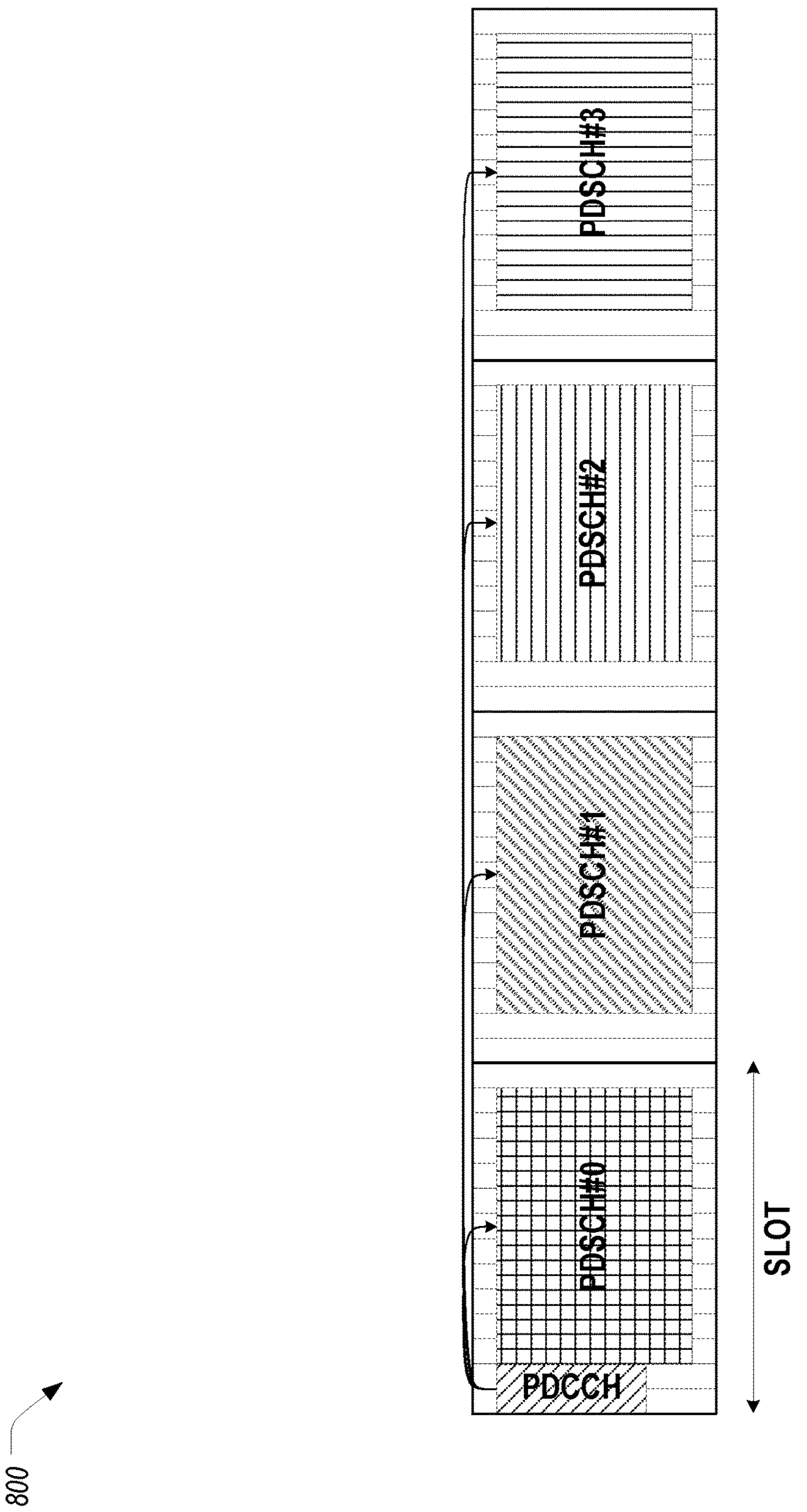
FIG. 8 illustrates a diagram of multi-transmission time interval (TTI) scheduling for PDSCHs, in accordance with some aspects.

For systems operating above 52.6 GHz carrier frequency, the subcarrier spacing is increased and the slot duration is reduced. A DCI may schedule PDSCH transmissions with one or multiple TBs. FIG. 8 illustrates one example of multi-PDSCH scheduling. More specifically, FIG. 8 illustrates diagram 800 of multi-transmission time interval (TTI) scheduling for PDSCHs, in accordance with some aspects. In diagram 800, four PDSCHs (PDSCH #0-3) with different transport blocks (TB) are scheduled by a single DCI.

The disclosed techniques include a design for HARQ-ACK transmission assuming multiple PDSCHs can be scheduled by a DCI. The disclosed techniques also include a design to perform time bundling for a semi-static HARQ-ACK codebook for multi-PDSCH scheduling in systems operating above 52.6 GHz carrier frequency, considering potential limitations on the multi-PDSCH scheduling for codebook size reduction.

In some aspects, a DCI may be able to schedule one or more PDSCHs with separate TBs. The number of scheduled PDSCHs by the DCI may be explicitly indicated by a field in the DCI. Alternatively, the number of scheduled PDSCHs by the DCI is jointly coded with other information fields. For example, the number of scheduled PDSCHs for a row in a time-domain resource allocation (TDRA) table equals the number of configured SLIVs of the row. The maximum number of PDSCHs scheduled by a multi-TTI DCI is the maximum number of scheduled PDSCHs among all rows.

For a row of a TDRA table, each SLIV can be configured in a different slot. Alternatively, one or more SLIVs may be configured in the same slot.

The use of multi-TTI scheduling for PDSCH transmission does not necessarily mean that the uplink channel condition is good. Therefore, it is beneficial to apply a certain bundling scheme to reduce the HARQ-ACK payload on PUCCH or PUSCH.

In some aspects, corresponding to a value $K_{1,k}$ in the set of K1, one or more ending DL slots for the PDSCH transmissions can be determined. For the HARQ-ACK transmission in the UL slot $n_U$ and value $K_{1,k}$, PDSCH transmission(s) can be ended in DL slots $\lfloor (n_U - K_{1,k}) \cdot 2^{\mu_{DL}-\mu_{UL}} \rfloor + j$, j=0, 1, . . . , $\lceil 2^{\mu_{DL}-\mu_{UL}} \rceil - 1$. Then, the set of the DL slots that can be used for PDSCH transmissions can be determined by all the determined ending DL slots corresponding to all the values in the set of K1.

A set of pairs ($d_{k,j}$, r) can be determined for each DL slot that is determined by a value $K_{1,k}$ in the set of K1. A pair ($d_{k,j}$, r) indicates the PDSCH transmissions that can be scheduled by a DCI indicating a row r in the TDRA table and value $K_{1,k}$ and ends in the DL slot $\lfloor (n_U - K_{1,k}) \cdot 2\mu DL - \mu UL \rfloor +$ j. For HARQ-ACK transmission in slot $n_U$, the corresponding set of pairs for a determined DL slot only includes a pair ($d_{k,j}$, r) if at least one of the PDSCH transmissions that are associated with the pair ($d_{k,j}$, r) is mapped to the determined DL slot. The set of pairs for a determined DL slot may be further limited to only include a pair ($d_{k,j}$, r) if the pair contains a SLIV in the determined DL slot that is not overlapped with any UL symbol in the determined DL slot according to the semi-static TDD UL-DL configuration if configured.

To allocate occasion(s) for a determined DL slot, overlap checking can be done using the set of pairs ($d_{k,j}$, r) for the determined DL slot. Alternatively, overlap checking can be performed using the SLIVs in the determined DL slot from the set of pairs ($d_{k,j}$, r). At most one occasion can be allocated for one determined DL slot. Specifically, one occasion can be allocated for a determined DL slot, if at least one SLIV from the set of pairs ($d_{k,j}$, r) for the determined DL slot is available for PDSCH transmission in the determined DL slot. Alternatively, zero, one, or multiple occasions may be allocated for one determined DL slot, assuming one or more PDSCHs can be scheduled in a slot.

In some aspects, the occasions for each slot in a set of determined DL slots are allocated first, then multiple occasions can be bundled to generate a bundled occasion. The payload size of the Type1 codebook can be determined by the number of bundled occasions.

In some aspects, the occasions in a bundle of N consecutive DL slots are bundled into one bundled occasion. N is predefined or configured by high layer signaling. For HARQ-ACK transmission in a UL slot, denote the minimum index and maximum index of the determined DL slots as $D_{min}$, $D_{max}$ respectively, the set of DL slots that are considered in the generation of Type1 HARQ-ACK codebook are DL slot index $D_{min}$, $D_{min}+1$ . . . , $D_{max}$. The bundles of DL slots can be sequentially allocated in increasing order of slot index or decreasing order of slot index. The last bundle may have less than N DL slots. For example, the occasions, if allocated in DL slots $D_m$, $m = D_{min} + n \cdot N + [0, 1, \ldots, N-1]$, n=0, 1, . . . , $\lceil M/N \rceil - 1$ are bundled. The number of bundled occasions is $\lceil (D_{max} - D_{min} + 1)/N \rceil$. If none of a bundle of N consecutive DL slots is allocated with an occasion, the corresponding bundled occasion can be omitted. If none of a bundle of N consecutive slots can be used for PDSCH transmission with HARQ-ACK in the UL slot, e.g. any potential SLIV in a slot is overlapped with at least one UL symbol according to TDD UL-DL configuration, the corresponding bundled occasion can be omitted.

Figure 9:
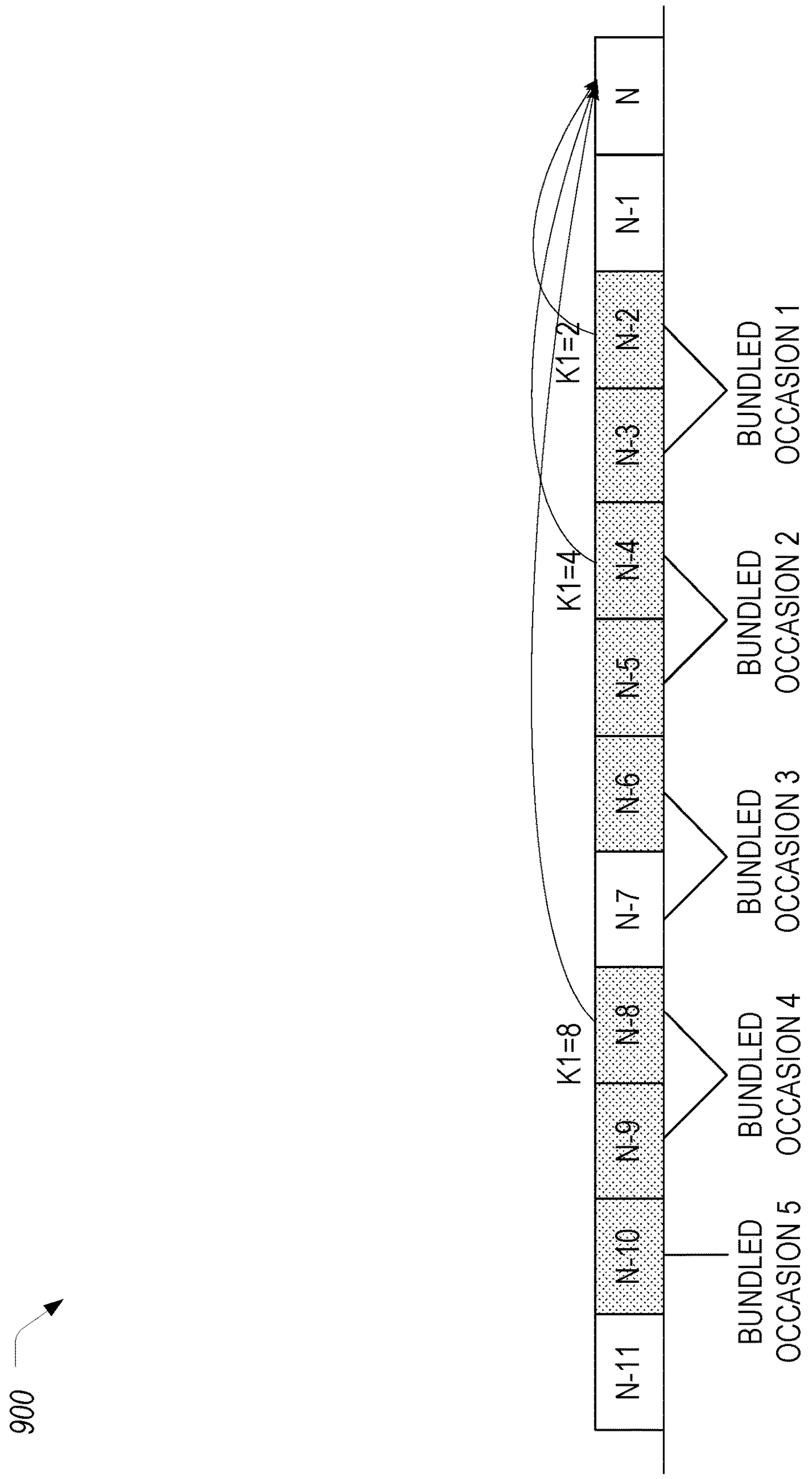
FIG. 9 illustrates a diagram of occasion bundling in consecutive slots, in accordance with some aspects.

FIG. 9 illustrates diagram 900 of occasion bundling in consecutive slots, in accordance with some aspects. More specifically, FIG. 9 illustrates one example of occasion bundling in every two consecutive slots. It can be assumed that 3 values of K1 are configured, i.e. 2, 4, 8, and the maximum number of SLIVs among all rows in the TDRA table is 3. Therefore, for PUCCH transmission in slot n, the set of determined DL slots are n-10, n-9, n-8, n-6, n-5, n-4, n-3, and n-2. It can be assumed that the bundles of DL slots are allocated starting from slot n-2 in decreasing order of slot index. Up to one occasion can be allocated in each of the determined DL slots. The slots n-7 and n-6 form a bundle. Since slot n-7 cannot carry a PDSCH with HARQ-ACK in PUCCH in slot n, the bundled HARQ-ACK for the bundle is purely determined by the HARQ-ACK information in slot n-6. Slot n-10 is a separate bundled too.

In some aspects, the occasions in a bundle of N determined DL slots are bundled into one bundled occasion. The bundles of determined DL slots can be sequentially allocated in increasing order of slot index or decreasing order of slot index. The last bundle may have less than N determined DL slots. For example, for HARQ-ACK transmission in a UL slot, denote the set of determined DL slots as $D_m$, m=0, 1, . . . M−1, the occasion in determined DL slots $D_m$, $m = n \cdot N + [0, 1, \ldots, N-1]$, n=0, 1, . . . , $\lceil M/N \rceil - 1$ are bundled. The number of bundled occasions are $\lceil M/N \rceil$. If none of a bundle of N determined DL slots can be used for PDSCH transmission with HARQ-ACK in the UL slot, e.g. any potential SLIV in a determined DL slot is overlapped with at least one UL symbol according to TDD UL-DL configuration, the corresponding bundled occasion can be omitted.

Figure 10:
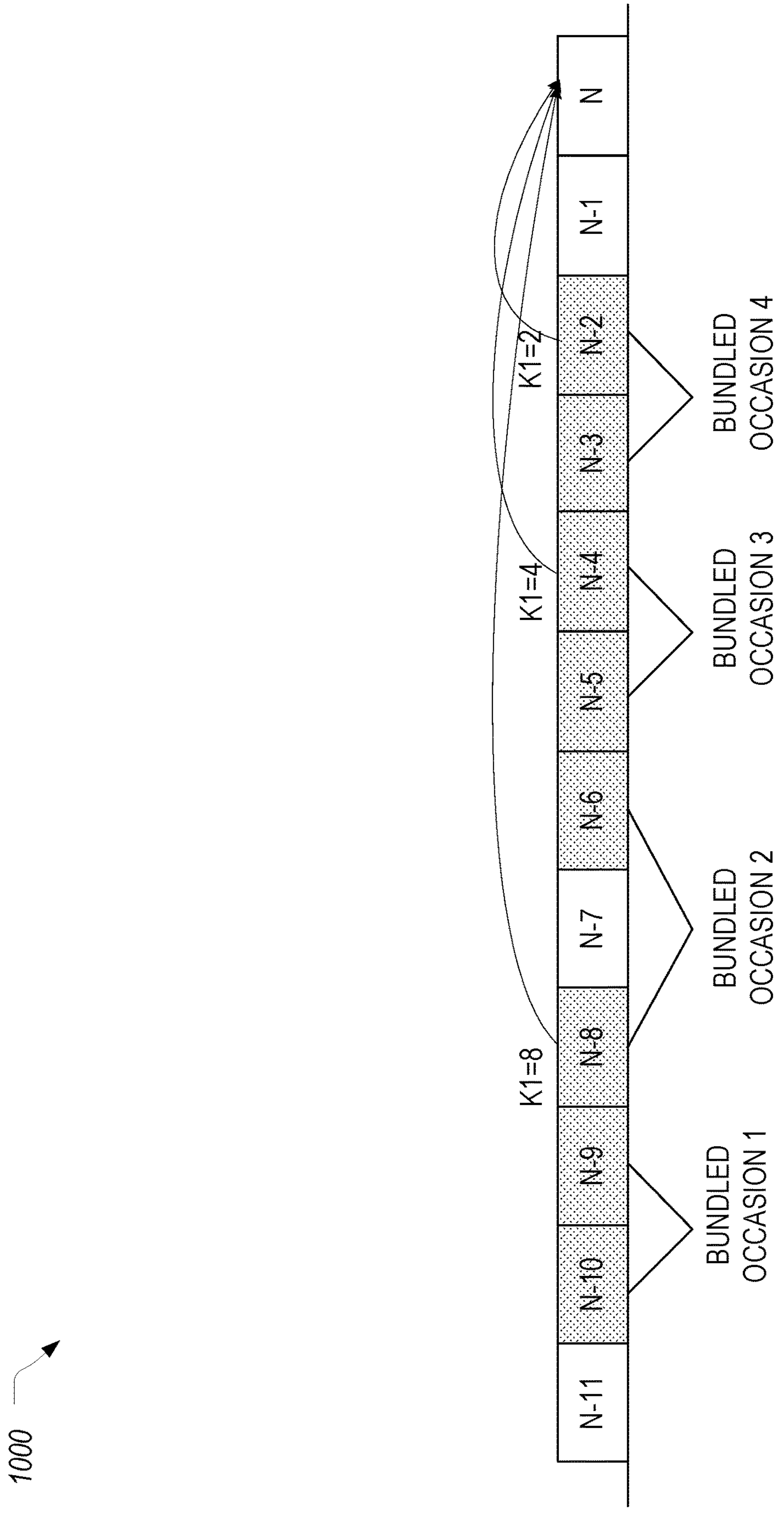
FIG. 10 illustrates a diagram of occasion bundling in determined downlink (DL) slots, in accordance with some aspects.

FIG. 10 illustrates a diagram 1000 of occasion bundling in determined downlink (DL) slots, in accordance with some aspects. More specifically, FIG. 10 illustrates one example of occasion bundling in every two determined DL slots. It uses the same assumption on the set of K1 and a TDRA table as in FIG. 9. It is assumed that the bundles of determined DL slots are allocated starting from slot n-10 in increasing order of slot index. The slot n-7 is skipped in the bundling since it is not a determined DL slot for UL slot n.

In some embodiments, the occasions in a bundle of N determined DL slots with the allocated occasion(s) are bundled into one bundled occasion. For a determined DL slot, if there is no schedulable SLIV by considering the TDD UL-DL configuration, the occasion is not allocated for the determined DL slot. The bundles of determined DL slots with the allocated occasion(s) can be sequentially allocated in increasing order of slot index or decreasing order of slot index. The last bundle may have less than N DL slots with the allocated occasion(s). For example, for HARQ-ACK transmission in a UL slot, denote the set of determined DL slots with allocated occasions as $D_m$, m=0, 1, . . . M−1, the occasion in determined DL slots $D_m$, $m = n \cdot N + [0, 1, \ldots, N-1]$, n=0, 1, . . . , $\lceil M/N \rceil - 1$ are bundled. The number of bundled occasions are $\lceil M/N \rceil$.

Figure 11:
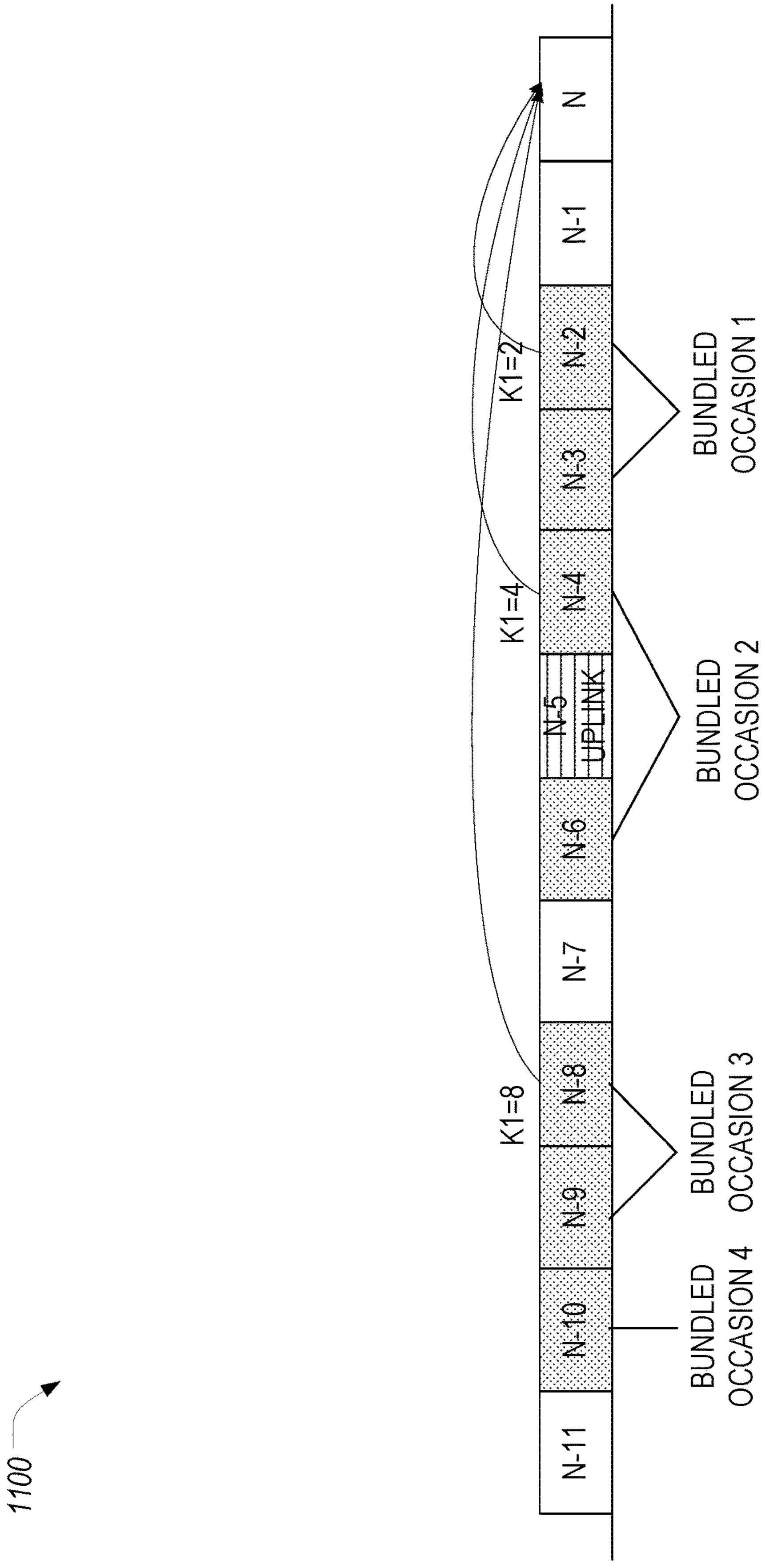
FIG. 11 illustrates a diagram of occasion bundling in determined DL slots with allocated occasions, in accordance with some aspects.

FIG. 11 illustrates diagram 1100 of occasion bundling in determined DL slots with allocated occasions, in accordance with some aspects. More specifically, FIG. 11 illustrates one example of occasion bundling in every two determined DL slots with the allocated occasion(s). It uses the same assumption on the set of K1 and a TDRA table as in FIG. 9. It is assumed that the bundles of determined DL slots with the allocated occasion(s) are allocated starting from slot n-2 in decreasing order of slot index. The slot n-7 is skipped in the bundling since it is not a determined DL slot for UL slot n. No occasion is allocated for slot n-5 since it is an uplink slot and cannot be used for PDSCH transmission. Therefore, slot n-5 is skipped in the bundling too.

In some aspects, each bundle of N consecutive occasions is bundled into one bundled occasion. The bundles of occasions can be sequentially allocated in increasing order of occasion index or decreasing order of occasion index. The last bundle may have less than N occasions. For example, for HARQ-ACK transmission in a UL slot, denote the set of occasions as $D_m$, m=0, 1, . . . M−1, the occasions $D_m$, m=n·N+[0, 1, . . . , N−1], n=0, 1, . . . , ⌈M/N⌉−1 are bundled. The number of bundled occasions are ⌈M/N⌉. If any potential SLIV that corresponds to the bundle of N consecutive occasions is overlapped with at least one UL symbol according to TDD UL-DL configuration, the bundled occasion can be omitted.

In some embodiments, an occasion is only allocated if at least one potential SLIV that corresponds to the occasions is not overlapped with any UL symbol according to TDD UL-DL configuration. Each bundle of N consecutive occasions is bundled into one bundled occasion. The bundles of occasions can be sequentially allocated in increasing order of occasion index or decreasing order of occasion index. The last bundle may have less than N occasions. For example, for HARQ-ACK transmission in a UL slot, denote the set of allocated occasions as $D_m$, m=0, 1, . . . M−1, the occasions $D_m$, m=n·N+[0, 1, . . . , N−1], n=0, 1, . . . , ⌈M/N⌉−1 are bundled. The number of bundled occasions are ⌈M/N⌉.

Since the multiple PDSCHs are scheduled by the same DCI, they are either received or not received as a whole. Consequently, there will be no error case of missing a subset of the multiple PDSCHs. Therefore, bundling of HARQ-ACK bits for PDSCHs scheduled by a multi-TTI DCI can be error-free. In the above options, the gNB may not schedule two PDSCHs by two DCIs corresponding to the same bunded occasion. In this regard, there can be limited confusion on the interpretation at the gNB of the bundled HARQ-ACK information.

In some embodiments, the last PDSCH of the PDSCH transmissions that is schedulable by a DCI cannot end earlier than the start of the first PDSCH of the other PDSCH transmissions that are schedulable by another DCI, if the last PDSCH and the first PDSCH correspond to the same bundle of slots or occasions. In other words, the PDSCH transmissions corresponding to a bundle of slots or occasions can only be scheduled by a single DCI. The multiple slots or occasions in the bundle share a bundled occasion. The payload size of the Type1 codebook is determined by the number of bundled occasions. The maximum number of slots or occasions in a bundle, which is denoted as N, is predefined or configured by high layer signaling. In this embodiment, one occasion can be allocated for a determined DL slot, if at least one SLIV from the set of pairs ($d_{k,j}$, r) for the determined DL slot is available for PDSCH transmission in the determined DL slot.

In some aspects, a bundle may correspond to up to N consecutive DL slots. For HARQ-ACK transmission in a UL slot, denote the minimum index and maximum index of the determined DL slots as $D_{min}$, $D_{max}$ respectively. The bundles of DL slots can be sequentially allocated from slot indexes $D_{min}$ to $D_{max}$, or from slot indexes $D_{max}$ to $D_{min}$. A different bundle may contain a different number of DL slots. The number of slots in each bundle should be maximized, which is to reduce HARQ payload size. If none of the consecutive DL slots in a bundle is allocated with an occasion, the corresponding bundled occasion can be omitted. If none of the N consecutive slots in a bundle can be used for PDSCH transmission, e.g., any potential SLIV in a slot is overlapped with at least one UL symbol according to TDD UL-DL configuration, the corresponding bundled occasion can be omitted.

In some aspects, a bundle may correspond to up to N determined DL slots. For HARQ-ACK transmission in a UL slot, denote the set of determined DL slots as $D_m$, m=0, 1, . . . M−1. The bundles of determined DL slots can be sequentially allocated in increasing order of m, or decreasing order of m. A different bundle may contain a different number of DL slots. If none of the determined DL slots in a bundle can be used for PDSCH transmission with HARQ-ACK in the UL slot, e.g., any potential SLIV in a determined DL slot is overlapped with at least one UL symbol according to TDD UL-DL configuration, the corresponding bundled occasion can be omitted.

Figure 12:
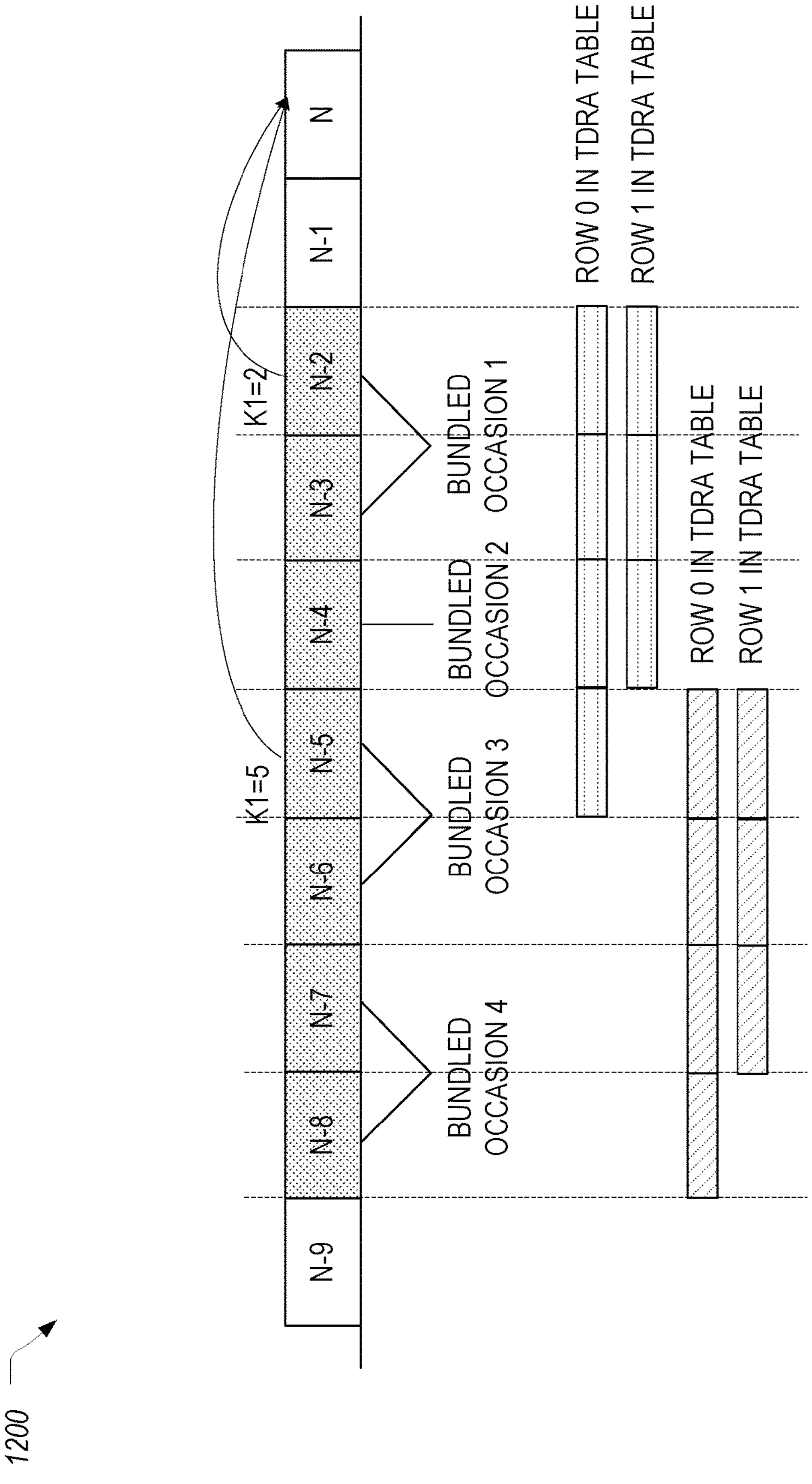
FIG. 12 illustrates a diagram of a flexible size of a bundle of determined DL slots, in accordance with some aspects.

FIG. 12 illustrates diagram 1200 of the flexible size of a bundle of determined DL slots, in accordance with some aspects. More specifically, FIG. 12 illustrates one example of occasion bundling with up to two determined DL slots. It is assumed that 2 values of K1 are configured, i.e., 2, 5, and two rows are configured in the TDRA table which respectively consists of 4 or 3 SLIVs. Therefore, for PUCCH transmission in slot n, the set of determined DL slots are from slot n-8 to n-2. It is assumed that the bundles of determined DL slots are allocated starting from slot n-2 in decreasing order of slot index. One occasion can be allocated in each of the determined DL slots. The slots n-3 and n-2 form a bundle. The slots n-5 and n-4 cannot be a bundle since it is possible to schedule row 1 with K1=2 and any row with K1=5 simultaneously. Therefore, slot n-4 is a separate bundle. The slots n-6 and n-5 form a bundle. The slots n-8 and n-7 form a bundle. With such a bundling scheme, a bundled HARQ-ACK only associates with PDSCH(s) that are scheduled by a single DCI.

In some embodiments, a bundle may correspond to up to N determined DL slots with the allocated occasion(s). For a determined DL slot, if there is no schedulable SLIV by considering the TDD UL-DL configuration, the occasion is not allocated for the determined DL slot. For HARQ-ACK transmission in a UL slot, denote the set of determined DL slots with allocated occasions as $D_m$, m=0, 1, . . . M−1. The bundles of determined DL slots can be sequentially allocated in increasing order of m, or decreasing order of m. Different bundles may contain a different number of DL slots.

Figure 13:
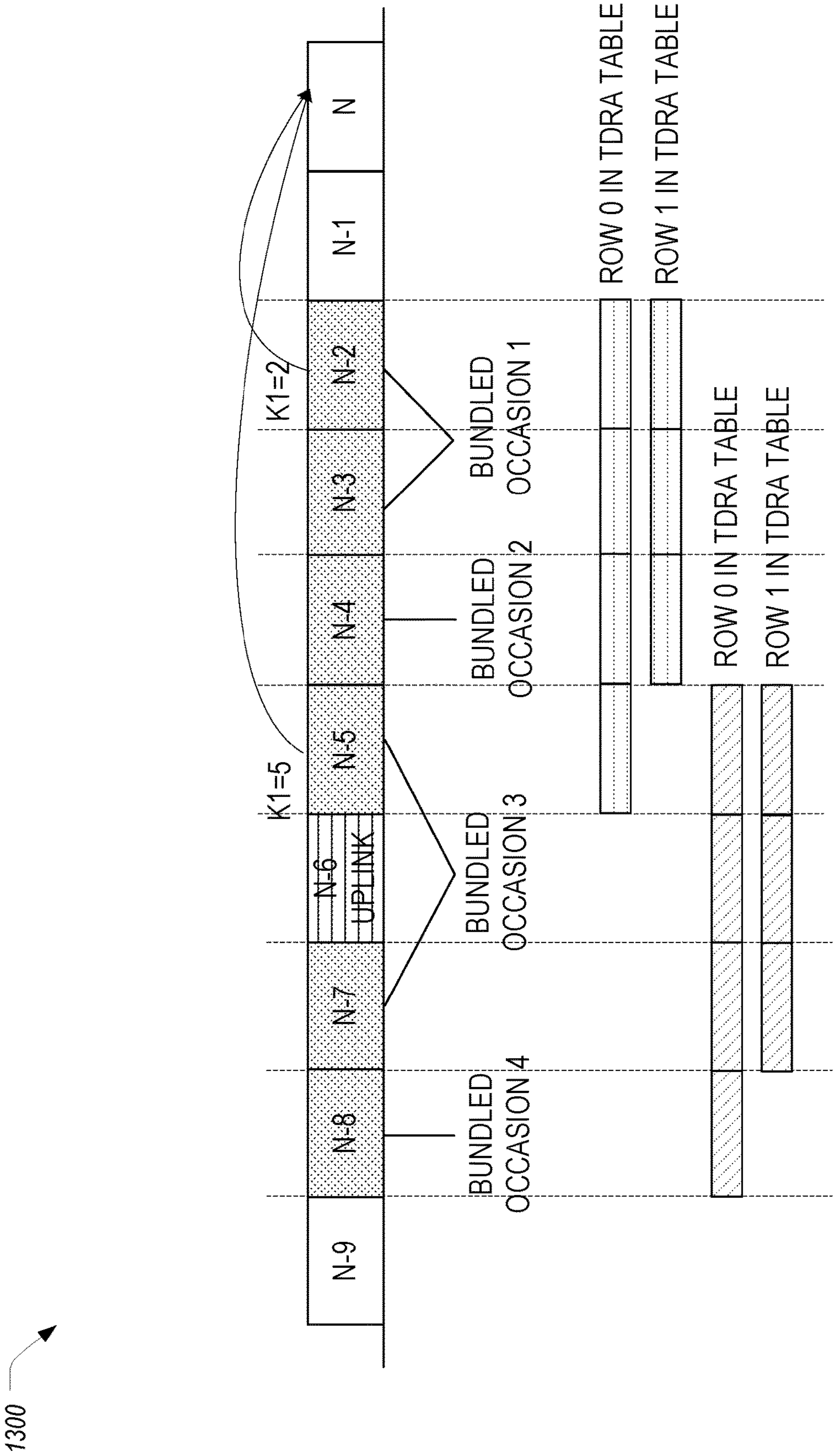
FIG. 13 illustrates a diagram of a flexible size of a bundle of determined DL slots with allocated occasions, in accordance with some aspects.

FIG. 13 illustrates diagram 1300 of the flexible size of a bundle of determined DL slots with allocated occasions, in accordance with some aspects. More specifically, FIG. 13 illustrates one example of occasion bundling with two determined DL slots with the allocated occasion(s). It uses the same assumption on the set of K1 and a TDRA table as in FIG. 12. It is assumed that the bundles of determined DL slots are allocated starting from slot n-2 in decreasing order of slot index. No occasion is allocated for slot n-6 since it is an uplink slot and cannot be used for PDSCH transmission. Therefore, slot n-6 is skipped in the determination of bundled occasions. The slots n-3 and n-2 form a bundle. The slot n-4 is a separate bundle. The slots n-7 and n-5 form a bundle. Slot n-8 forms a bundle.

In some embodiments, the bundled HARQ-ACK is ACK if all HARQ-ACKs are ACK in the bundle of N slots or occasions, otherwise, the bundled HARQ-ACK is NACK. If a slot is not scheduled with PDSCH transmission in the N slots, it is neglected in the determination of the bundled HARQ-ACK, or the HARQ-ACK for the slot can be considered as ACK in the bundling operation.

In some aspects, it is described in a way that the occasions are first allocated for each determined DL slot, then the occasions are bundled. Alternatively, the occasions can be directly allocated consider a bundle of up to N consecutive slots or N determined DL slots. In one example, if at least one potential SLIV is not overlapped with any UL symbol in the N consecutive slots in a bundle according to TDD UL-DL configuration, a bundled occasion is allocated. In another example, if at least one potential SLIV is not overlapped with any UL symbol in the N determined DL slots in a bundle according to TDD UL-DL configuration, a bundled occasion is allocated.

In some embodiments, the set of SLIVs of a row r in the TDRA table can be divided into up to B bundles, B≥1, the up to B bundles are one-by-one associated with up to B reference SLIVs of the row r. The HARQ-ACK associated with SLIVs of a bundle is bundled. The reference SLIV for a bundle may not be an element of the bundle of SLIVs. The reference SLIV for a bundle of row r must be an element of row r. A reference SLIV is considered available for PDSCH transmission if at least one SLIV in the bundle of SLIVs associated with the reference SLIV is available for PDSCH transmission. The SLIVs other than the up to B reference SLIVs are removed from the row r. Finally, the occasions for candidate PDSCH receptions can be allocated by the set of K1 values and the modified TDRA table with each row r only containing reference SLIVs.

In some aspects, the above set of SLIVs of row r is the set of configured SLIVs of row r by high layer signaling. Denote the number of configured SLIVs as L, the configured SLIVs are indexed by 0, 1, . . . , L−1. The maximum number of bundles B can be configured by the high layer. Then, the L configured SLIVs are divided into up to B bundles. Each bundle contains $\lfloor L/B \rfloor$ or $\lceil L/B \rceil$ consecutive SLIVs. Alternatively, the maximum number of configured SLIVs in a bundle can be configured, which is denoted as P. Consequently, $B=\lceil L/P \rceil$. Each bundle contains P consecutive SLIVs except the last bundle that may have mod (L, P) SLIVs.

In some embodiments, for PDSCH transmissions ending in a DL slot, the above set of SLIVs of row r only includes an available SLIV of row r if the SLIV is not overlapped with a UL symbol according to the configured TDD UL-DL configuration. Denote the number of available SLIVs as LA, the available SLIVs are indexed by 0, 1, . . . , $L_A-1$. The maximum number of bundles B can be configured by the high layer. Then, the LA available SLIVs are divided into up to B bundles. Each bundle contains $\lfloor L_A/B \rfloor$ or $\lceil L_A/B \rceil$ consecutive available SLIVs. Alternatively, the maximum number of available SLIVs in a bundle can be configured, which is denoted as P. Consequently, $B=\lceil L_A/P \rceil$. Each bundle contains P consecutive available SLIVs except the last bundle that may have mod ($L_A$, P) available SLIVs.

In some embodiments, to allocate the occasions for the HARQ-ACK transmission with time bundling:

(a) a set of DL slots are determined which contains all the unique DL slots obtained by considering all combinations of the configured K1 values and the reference SLIVs in all rows of the modified TDRA table.

(b) a set of reference SLIVs corresponding to a determined DL slot is determined which contains all the reference SLIVs for the determined DL slot obtained by considering all combinations of the configured K1 values and the reference SLIVs in all rows of the modified TDRA table.

(c) The occasions are determined by the set of reference SLIVs corresponding to each determined DL slot, considering the configured TDD UL-DL configuration. Here, a reference SLIV is considered available for PDSCH transmission if at least one SLIV in the bundle of SLIVs associated with the reference SLIV is available for PDSCH transmission. For example, the existing procedure for Type1 HARQ-ACK codebook generation in Rel-16 (TS 38.213, section 9.1.2.1) can be reused, with the exception to adopt the above rule on checking the availability of reference SLIV.

Alternatively, to allocate the occasions for the HARQ-ACK transmission with time bundling:

(a) a set of DL slots are determined which contains all the unique DL slots obtained by considering all combinations of the configured K1 values and the reference SLIVs in all rows of the modified TDRA table.

(b) a set of pairs ($d_{k,j}$, r) corresponding to a determined DL slot are determined which contain all the pairs for the determined DL slot obtained by considering all combinations of the configured K1 values and the reference SLIVs in all rows of the modified TDRA table.

(c) The occasions are determined by the set of pairs ($d_{k,j}$, r) corresponding to each determined DL slot, considering the configured TDD UL-DL configuration. Here, the overlap checking can be done considering the reference SLIVs in the one or multiple slots of the set of pairs ($d_{k,j}$, r) for the determined DL slot.

In some embodiments, the above up to B reference SLIVs of row r could be any up to B SLIVs of row r. Specifically, it could be the last min(B, L) SLIVs of row r. Alternatively, the above up to B reference SLIVs of row r could be any up to B available SLIVs of row r. Specifically, it could be the last min(B, $L_A$) available SLIVs of row r.

Figure 14:
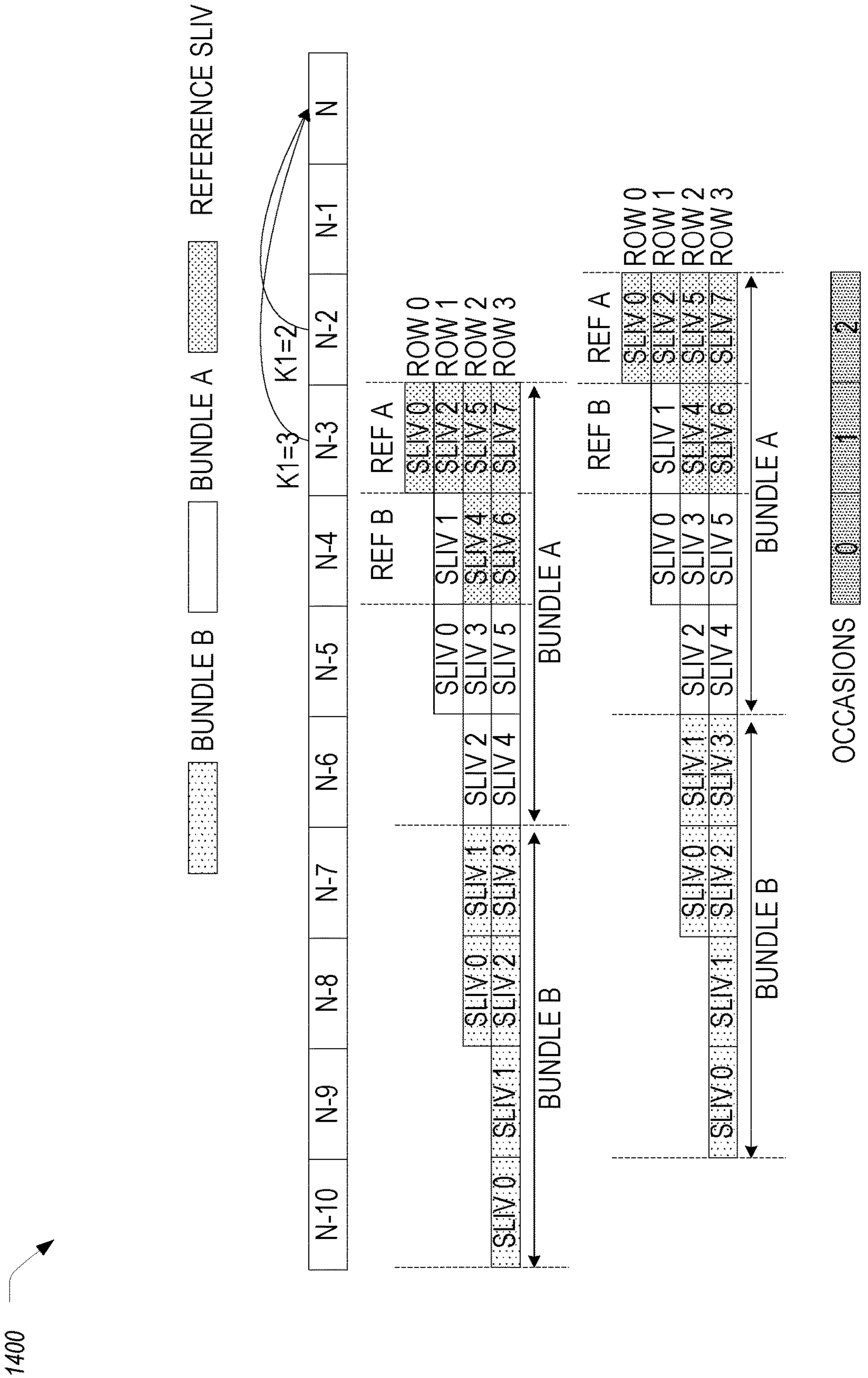
FIG. 14 illustrates a diagram of a HARQ-ACK codebook based on reference start and length indicator values (SLIVs), in accordance with some aspects.

FIG. 14 illustrates diagram 1400 of a HARQ-ACK codebook based on reference start and length indicator values (SLIVs), in accordance with some aspects. More specifically, FIG. 14 illustrates one example to generate the occasions with time bundling. It can be assumed that 2 values of K1 are configured, i.e., {2, 3}. It can be assumed that each bundle can contain HARQ-ACK for a maximum of four PDSCHs. Four rows are configured in the TDRA table. Row 0 consists of a single SLIV, i.e. SLIV 0. Row 1 consists of three SLIVs, i.e. SLIV 0-2. Row 2 consists of six SLIVs, i.e. SLIV 0-5. Row 3 consists of eight SLIVs, i.e. SLIV 0-7.

In some aspects, the reference SLIVs can be determined for each bundle for each row in the TDRA table. The row 0 maps to one bundle and SLIV 0 is used as reference SLIV. Row 1 maps to one bundle and SLIV 2 is used as reference SLIV. Row 2 maps to two bundles and SLIVs 4 and 5 are respectively used as reference SLIVs for the two bundles. Row 3 maps to two bundles and SLIVs 6 and 7 are respectively used as reference SLIVs for the two bundles.

In some aspects, the TDRA table can be modified so that each row only consists of the reference SLIVs. Row 0 only includes SLIV 0. Row 1 only includes SLIV 2. Row 2 includes SLIV 4 and 5. Row 3 includes SLIV 6 and 7.

In some aspects, the occasions in Type1 HARQ-ACK codebook can be allocated using the set of K1 value {2, 3} and the modified TDRA table by reusing the Rel-16 pseudo code. An example exception is that the original SLIVs included in a bundle are used to check if the associated reference SLIV is available for PDSCH transmission or not, based on the configured TDD UL-DL configuration. For row 0, it is to check the availability of SLIV 0. For row 1, the reference SLIV 2 is available if at least one SLIV from SLIV 0-2 of row 1 is available for PDSCH transmission. For row 2, the reference SLIV 4 is available if at least one SLIV from SLIV 0-1 of row 2 is available for PDSCH transmission, while the reference SLIV 5 is available if at least one SLIV from SLIV 2-5 of row 2 is available for PDSCH transmission. For row 3, the reference SLIV 6 is available if at least one SLIV from SLIV 0-3 of row 3 is available for PDSCH transmission, while the reference SLIV 7 is available if at least one SLIV from SLIV 4-7 of row 3 is available for PDSCH transmission. In some aspects, the number of occasions in the Type1 HARQ-ACK codebook is at most 3.

Figure 15:
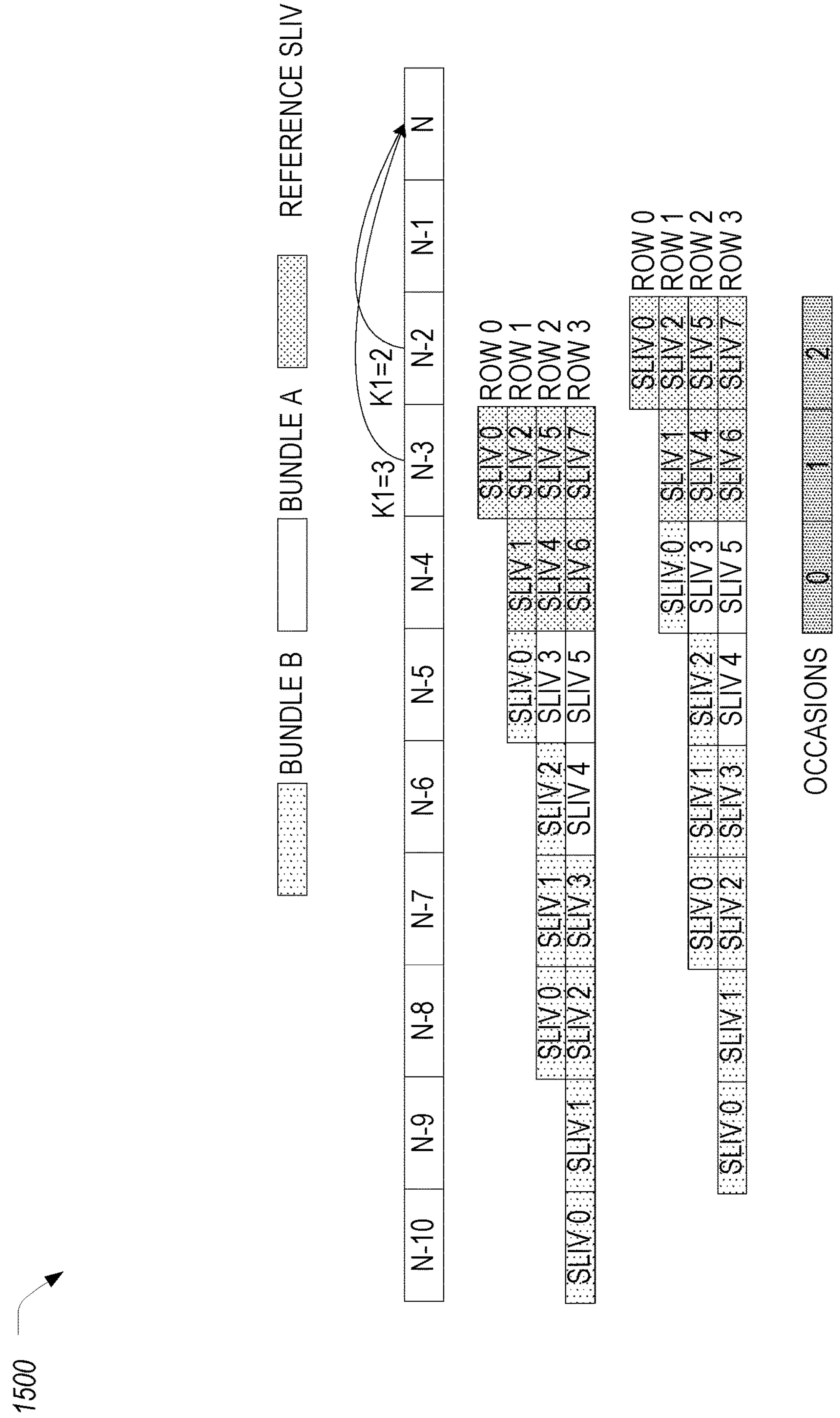
FIG. 15 illustrates a diagram of a HARQ-ACK codebook based on reference SLIVs, in accordance with some aspects.

FIG. 15 illustrates diagram 1500 of a HARQ-ACK codebook based on reference SLIVs, in accordance with some aspects. More specifically, FIG. 15 illustrates another example to generate the occasions with a different way of time bundling. It uses the same assumption of K1 values and TDRA table as FIG. 14. It can be assumed that a maximum of two bundles are generated for each row. The reference SLIVs can be determined for each bundle for each row in the TDRA table.

The row 0 maps to one bundle and SLIV 0 is used as reference SLIV. Row 1 maps to two bundles having 1 SLIV and 2 SLIVs respectively. SLIVs 1 and 2 are respectively used as reference SLIVs for the two bundles. Row 2 maps to two bundles with 3 SLIVs. SLIVs 4 and 5 are respectively used as reference SLIVs for the two bundles. Row 3 maps to two bundles with 4 SLIVs. SLIV 6 and 7 are respectively used as reference SLIVs for the two bundles.

In some aspects, the TDRA table can be modified so that each row only consists of the reference SLIVs. Row 0 only includes SLIV 0. Row 1 includes SLIV 1 and 2. Row 2 includes SLIV 4 and 5. Row 3 includes SLIV 6 and 7.

In some aspects, the occasions in Type1 HARQ-ACK codebook can be allocated using the set of K1 value {2, 3} and the modified TDRA table by reusing the Rel-16 pseudo code. An example exception is that the original SLIVs included in a bundle are used to check if the associated reference SLIV is available for PDSCH transmission or not, based on the configured TDD UL-DL configuration.

For row 0, it is to check the availability of SLIV 0. For row 1, the reference SLIV 1 is available if SLIV 0 of row 1 is available for PDSCH transmission, while the reference SLIV 2 is available if at least one SLIV from SLIV 1-2 of row 1 is available for PDSCH transmission. For row 2, the reference SLIV 4 is available if at least one SLIV from SLIV 0-2 of row 2 is available for PDSCH transmission, while the reference SLIV 5 is available if at least one SLIV from SLIV 3-5 of row 2 is available for PDSCH transmission. For row 3, the reference SLIV 6 is available if at least one SLIV from SLIV 0-3 of row 3 is available for PDSCH transmission, while the reference SLIV 7 is available if at least one SLIV from SLIV 4-7 of row 3 is available for PDSCH transmission. In some aspects, the number of occasions in the Type1 HARQ-ACK codebook is at most 3.

In some embodiments, the above up to B reference SLIVs of row r could be separately determined for each K1 value in a sequence. For example, it could be determined in decreasing order of K1 values. In some aspects, for the largest K1 value, the above up to B reference SLIVs of row r could be the last min(B, L) SLIVs of row r. Alternatively, it can be the last min(B, $L_A$) available SLIVs of row r.

In some aspects, for a K1 value $K_{1,k}$, denote the set of slots that include the reference SLIVs associated with bundles for K1 values that are bigger than $K_{1,k}$ as set R, the above up to B reference SLIVs of row r could be firstly determined from the SLIVs of row r in the slots of set R that contain any SLIV of row r corresponding to the K1 value $K_{1,k}$. If not all reference SLIVs are allocated, the remaining reference SLIVs could be the last SLIVs of row r corresponding to the K1 value $K_{1,k}$. Alternatively, the remaining reference SLIVs could be the last available SLIVs of row r corresponding to the K1 value $K_{1,k}$.

Figure 16:
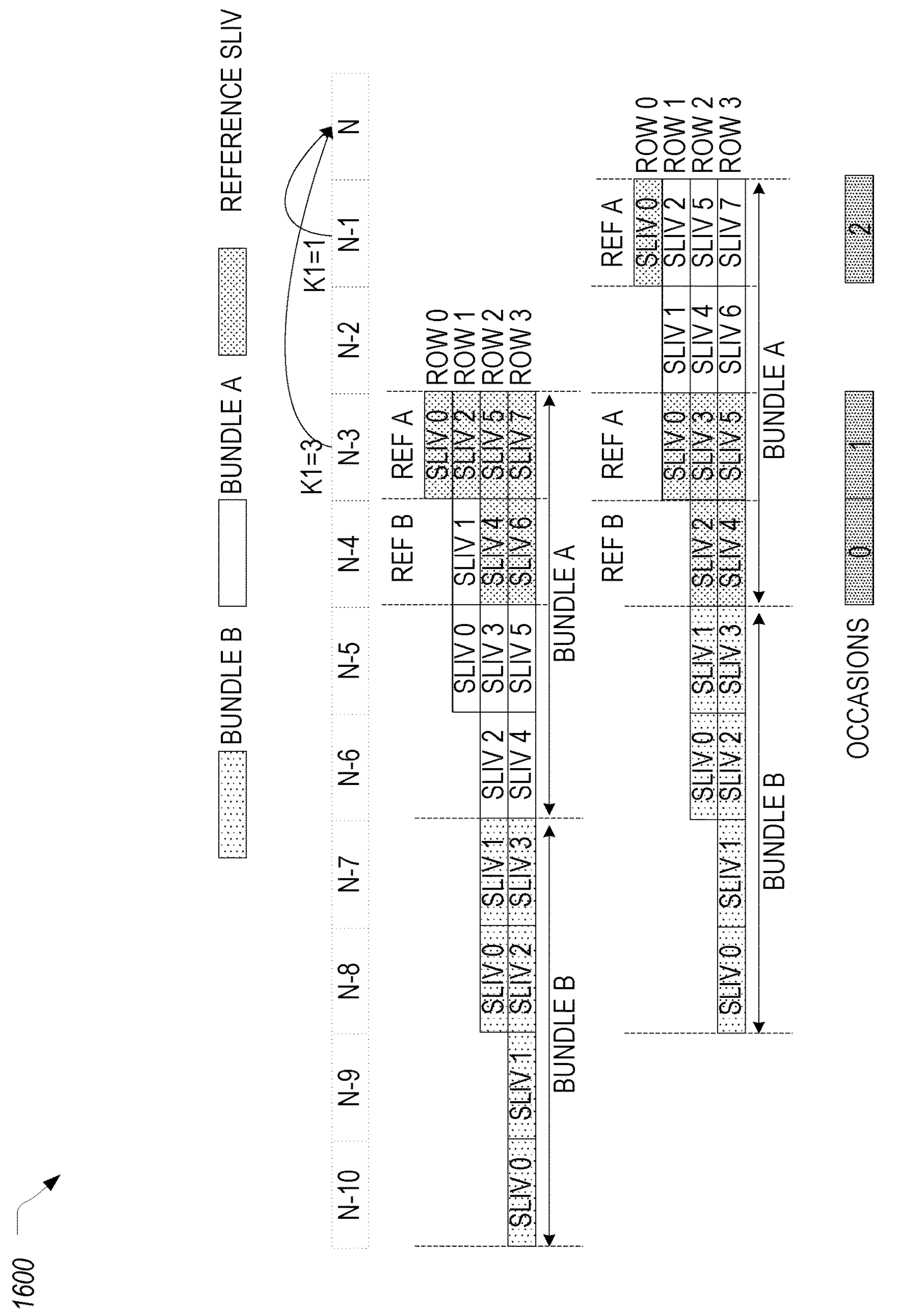
FIG. 16 illustrates a diagram of a HARQ-ACK codebook based on reference SLIVs allocated in sequence, in accordance with some aspects.

FIG. 16 illustrates diagram 1600 of a HARQ-ACK codebook based on reference SLIVs allocated in sequence, in accordance with some aspects. More specifically, FIG. 16 illustrates another example to generate the occasions with time bundling using sequential determination of reference SLIVs. It can be assumed that 2 values of K1 are configured, i.e., {1, 3}. It is assumed that each bundle can contain HARQ-ACK for a maximum of four PDSCHs and the same TDRA table as FIG. 14. The reference SLIVs can be determined for each bundle for each row in the TDRA table.

For K1=3, the reference SLIVs for the four rows are the same as that of FIG. 14.

For K1=1:

(a) The row 0 is not overlapped with any slot with already allocated reference SLIVs, hence SLIV 0 is used as reference SLIV.

(b) Row 1 is overlapped with slot n-3 and contains an allocated reference SLIV, hence SLIV 0 of row 1 is used as reference SLIV.

(c) Row 2 is overlapped with slots n-4 and n-3 that contain allocated reference SLIVs, hence SLIVs 2 and 3 of row 2 are respectively used as reference SLIVs for the two bundles.

(d) Row 3 is overlapped with slots n-4 and n-3 that contain allocated reference SLIVs, hence SLIVs 4 and 5 of row 3 are respectively used as reference SLIVs for the two bundles.

In some aspects, the TDRA table can be modified so that each row only consists of the reference SLIVs. Row 0 only includes SLIV 0. Row 1 only includes SLIV 0. Row 2 includes SLIV 2 and 3. Row 3 includes SLIV 4 and 5.

In some aspects, the occasions in Type1 HARQ-ACK codebook can be allocated using the set of K1 value {1, 3} and the modified TDRA table by reusing the Rel-16 pseudo code. The only exception is that the original SLIVs included in a bundle are used to check if the associated reference SLIV is available for PDSCH transmission or not, based on the configured TDD UL-DL configuration. For K1=3, it is the same as that of FIG. 14.

For K1=1:

(a) For row 0, it is to check the availability of SLIV 0.

(b) For row 1, the reference SLIV 0 is available if at least one SLIV from SLIV 0-2 of row 1 is available for PDSCH transmission.

(c) For row 2, the reference SLIV 2 is available if at least one SLIV from SLIV 0-1 of row 2 is available for PDSCH transmission, while the reference SLIV 3 is available if at least one SLIV from SLIV 2-5 of row 2 is available for PDSCH transmission.

(d) For row 3, the reference SLIV 4 is available if at least one SLIV from SLIV 0-3 of row 3 is available for PDSCH transmission, while the reference SLIV 5 is available if at least one SLIV from SLIV 4-7 of row 3 is available for PDSCH transmission.

In some aspects, the number of occasions in the Type1 HARQ-ACK codebook is at most 3. If the occasion is generated following FIG. 14, it can include up to 4 occasions.

In some embodiments, the disclosed techniques include a system and method of wireless communication for HARQ-ACK transmission if one or multiple TTIs is scheduled by a downlink control information (DCI). In some aspects, a DCI is decoded by a UE from a physical downlink control channel (PDCCH). One or more physical downlink shared channels (PDSCH) that are scheduled by the DCI are decoded by the UE. In some aspects, the UE transmits a HARQ-ACK codebook which carries bundled HARQ-ACK information for the PDSCH transmissions scheduled by the DCI.

In some embodiments, the occasions for each slot in a set of determined DL slots are allocated first, then multiple occasions are bundled to generate a bundled occasion. In some embodiments, the occasions in a bundle of N consecutive DL slots are bundled into one bundled occasion. In some aspects, the occasions in a bundle of N determined DL slots are bundled into one bundled occasion. In some embodiments, the occasions in a bundle of N determined DL slots with the allocated occasion(s) are bundled into one bundled occasion. In some embodiments, each bundle of N consecutive occasions is bundled into one bundled occasion. In some aspects, the PDSCHs corresponding to a bundled occasion are scheduled by a single DCI.

In some embodiments, the last PDSCH of the PDSCH transmissions that is schedulable by a DCI does not end earlier than the start of the first PDSCH of the other PDSCH transmissions that are schedulable by another DCI, if the last PDSCH and the first PDSCH correspond to the same bundle of slots or occasions. In some aspects, a bundle corresponds to up to N consecutive DL slots. In some aspects, a bundle corresponds to up to N determined DL slots. In some aspects, a bundle corresponds to up to N determined DL slots with the allocated occasion(s).

In some embodiments, the set of SLIVs of a row r in the TDRA table is divided into one or multiple bundles, each bundle is associated with a SLIV of the row r, and the occasions for candidate PDSCH receptions are allocated by the set of K1 values and the modified TDRA table with each row r only containing reference SLIVs. In some aspects, the reference SLIV for a bundle of row r is an element of row r. In some aspects, the reference SLIV is considered available for PDSCH transmission if at least one SLIV in the bundle of SLIVs associated with the reference SLIV is available for PDSCH transmission. In some aspects, the above set of SLIVs of row r is the set of configured SLIVs of row r by high layer signaling. In some aspects, the above set of SLIVs of row r only includes an available SLIV of row r if the SLIV is not overlapped with a UL symbol according to the configured TDD UL-DL configuration. In some aspects, the reference SLIVs of row r are the last SLIVs of row r.

In some embodiments, for a K1 value $K_{1,k}$, denote the set of slots that include the reference SLIVs associated with bundles for K1 values that are bigger than $K_{1,k}$ as set R, the reference SLIVs of row r are firstly determined from the SLIVs of row r in the slots of set R that contain any SLIV of row r corresponding to the K1 value $K_{1,k}$, the remaining reference SLIVs are the last SLIVs of row r corresponding to the K1 value $K_{1,k}$.

Figure 17:
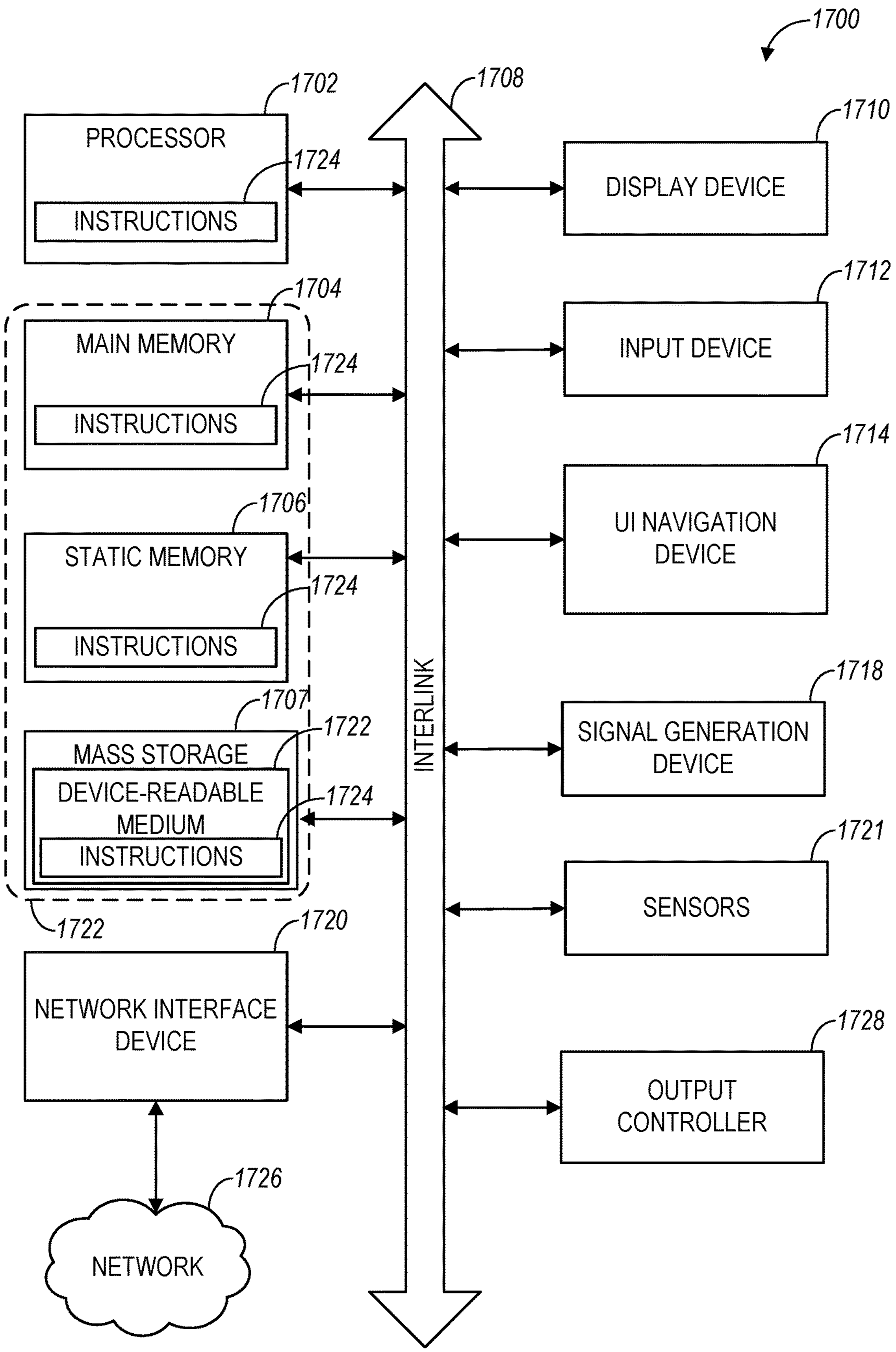
FIG. 17 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects.

FIG. 17 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects. In alternative aspects, the communication device 1700 may operate as a standalone device or may be connected (e.g., networked) to other communication devices.

Circuitry (e.g., processing circuitry) is a collection of circuits implemented in tangible entities of the device 1700 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1700 follow.

In some aspects, the device 1700 may operate as a standalone device or may be connected (e.g., networked) to other devices. In a networked deployment, the communication device 1700 may operate in the capacity of a server communication device, a client communication device, or both in server-client network environments. In an example, the communication device 1700 may act as a peer communication device in a peer-to-peer (P2P) (or other distributed) network environment. The communication device 1700 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1700 may include a hardware processor 1702 (e.g., a central processing unit (CPU), a graphics processing unit (GPU), a hardware processor core, or any combination thereof), a main memory 1704, a static memory 1706, and a storage device 1707 (e.g., hard drive, tape drive, flash storage, or other block or storage devices), some or all of which may communicate with each other via an interlink (e.g., bus) 1708.

The communication device 1700 may further include a display device 1710, an alphanumeric input device 1712 (e.g., a keyboard), and a user interface (UI) navigation device 1714 (e.g., a mouse). In an example, the display device 1710, input device 1712, and UI navigation device 1714 may be a touchscreen display. The communication device 1700 may additionally include a signal generation device 1718 (e.g., a speaker), a network interface device 1720, and one or more sensors 1721, such as a global positioning system (GPS) sensor, compass, accelerometer, or another sensor. The communication device 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1707 may include a communication device-readable medium 1722, on which is stored one or more sets of data structures or instructions 1724 (e.g., software) embodying or utilized by any one or more of the techniques or functions described herein. In some aspects, registers of the processor 1702, the main memory 1704, the static memory 1706, and/or the storage device 1707 may be, or include (completely or at least partially), the device-readable medium 1722, on which is stored the one or more sets of data structures or instructions 1724, embodying or utilized by any one or more of the techniques or functions described herein. In an example, one or any combination of the hardware processor 1702, the main memory 1704, the static memory 1706, or the storage device 1707 may constitute the device-readable medium 1722.

As used herein, the term "device-readable medium" is interchangeable with "computer-readable medium" or "machine-readable medium". While the communication device-readable medium 1722 is illustrated as a single medium, the term "communication device-readable medium" may include a single medium or multiple media (e.g., a centralized or distributed database, and/or associated caches and servers) configured to store the one or more instructions 1724. The term "communication device-readable medium" is inclusive of the terms "machine-readable medium" or "computer-readable medium", and may include any medium that is capable of storing, encoding, or carrying instructions (e.g., instructions 1724) for execution by the communication device 1700 and that causes the communication device 1700 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1724 may further be transmitted or received over a communications network 1726 using a transmission medium via the network interface device 1720 utilizing any one of a number of transfer protocols. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one single-input-multiple-output (SIMO), MIMO, or multiple-input-single-output (MISO) techniques. In some examples, the network interface device 1720 may wirelessly communicate using Multiple User MIMO techniques.

The term "transmission medium" shall be taken to include any intangible medium that is capable of storing, encoding, or carrying instructions for execution by the communication device 1700, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) and beyond wireless network, the apparatus comprising: processing circuitry, wherein to configure the UE for cross-carrier scheduling of data transmissions in the 5G NR and beyond wireless network, the processing circuitry is to: decode configuration signaling received from a base station, the configuration signaling indicating a first numerology parameter for a scheduling cell of the base station and a second numerology parameter for a scheduled cell of the base station; decode downlink control information (DCI) received via a physical downlink control channel (PDCCH) of the scheduling cell, the DCI scheduling a downlink (DL) data transmission in the scheduled cell of the base station; decode the DL data transmission received via a physical downlink shared channel (PDSCH) of the scheduled cell, when a difference between the first numerology parameter and the second numerology parameter is smaller than or equal to a pre-configured numerology threshold value; and refrain from decoding the DL data transmission when the difference between the first numerology parameter and the second numerology parameter is greater than the pre-configured numerology threshold value; and a memory coupled to the processing circuitry and configured to store the configuration signaling.

In Example 2, the subject matter of Example 1 includes, wherein the DCI schedules an uplink (UL) data transmission in the scheduled cell of the base station, and wherein the processing circuitry is configured to encode UL data for the UL data transmission via a physical uplink shared channel (PUSCH) of the scheduled cell when the difference between the first numerology parameter and the second numerology parameter is smaller than or equal to the pre-configured numerology threshold value.

In Example 3, the subject matter of Example 2 includes, wherein the processing circuitry is configured to refrain from encoding the UL data for the UL data transmission when the difference between the first numerology parameter and the second numerology parameter is greater than the pre-configured numerology threshold value.

In Example 4, the subject matter of Examples 1-3 includes, wherein the first numerology parameter is $\mu_{DCI}$, the second numerology parameter is $\mu_{DATA}$, the pre-configured numerology threshold value is $d_{max}$.

In Example 5, the subject matter of Example 4 includes, wherein the processing circuitry is configured to decode the DL data transmission when $|\mu_{DCI}-\mu_{DATA}|\leq d_{max}$, wherein a first subcarrier spacing (SCS) of an active bandwidth part (BWP) used for transmission of the DCI in the scheduling cell is $2^{\mu_{DCI}}\cdot 15$ kHz, and wherein a second SCS of an active BWP used for reception of the DL data transmission in the scheduled cell is $2^{\mu_{DATA}}\cdot 15$ KHz.

In Example 6, the subject matter of Examples 4-5 includes, wherein the configuration signaling activates a bandwidth part (BWP) on the scheduled cell when $|\mu_{DCI}-\mu_{DATA}|>d_{max}$.

In Example 7, the subject matter of Example 6 includes, wherein the processing circuitry is to: decode the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$; and refrain from changing the BWP on the scheduled cell, while utilizing the BWP for reception of the DL data transmission.

In Example 8, the subject matter of Examples 6-7 includes, wherein the processing circuitry is to: decode the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$; switch to a second BWP on the scheduled cell with numerology $\mu_{DATA,2}$ which satisfies $|\mu_{DCI}-\mu_{DATA,2}|\leq d_{max}$; and utilize the second BWP for reception of the DL data transmission.

In Example 9, the subject matter of Examples 1-8 includes, wherein the DCI schedules multiple PDSCH transmissions of DL data, and wherein the processing circuitry is to: encode a hybrid automatic repeat request acknowledgment (HARQ-ACK) codebook for transmission to the base station, the HARQ-ACK codebook including bundles HARQ-ACK information for the multiple PDSCH transmissions.

In Example 10, the subject matter of Examples 1-9 includes, transceiver circuitry coupled to the processing circuitry; and two or more antennas coupled to the transceiver circuitry.

Example 11 is a computer-readable storage medium that stores instructions for execution by one or more processors of a user equipment (UE), the instructions to configure the UE for cross-carrier scheduling of data transmissions in a Fifth Generation New Radio (5G NR) and beyond wireless network, and to cause the UE to perform operations comprising: decoding configuration signaling received from a base station, the configuration signaling indicating a first numerology parameter for a scheduling cell of the base station and a second numerology parameter for a scheduled cell of the base station; decoding downlink control information (DCI) received via a physical downlink control channel (PDCCH) of the scheduling cell, the DCI scheduling a downlink (DL) data transmission in the scheduled cell of the base station; decoding the DL data transmission received via a physical downlink shared channel (PDSCH) of the scheduled cell, when a difference between the first numerology parameter and the second numerology parameter is smaller than or equal to a pre-configured numerology threshold value; and refraining from decoding the DL data transmission when the difference between the first numerology parameter and the second numerology parameter is greater than the pre-configured numerology threshold value.

In Example 12, the subject matter of Example 11 includes, wherein the DCI schedules an uplink (UL) data transmission in the scheduled cell of the base station, and the operations further comprising: encoding UL data for the UL data transmission via a physical uplink shared channel (PUSCH) of the scheduled cell, when the difference between the first numerology parameter and the second numerology parameter is smaller than or equal to the pre-configured numerology threshold value.

In Example 13, the subject matter of Example 12 includes, the operations further comprising: refraining from encoding the UL data for the UL data transmission when the difference between the first numerology parameter and the second numerology parameter is greater than the pre-configured numerology threshold value.

In Example 14, the subject matter of Examples 11-13 includes, wherein the first numerology parameter is $\mu_{DCI}$, the second numerology parameter is $\mu_{DATA}$, the pre-configured numerology threshold value is $d_{max}$.

In Example 15, the subject matter of Example 14 includes, the operations further comprising: decoding the DL data transmission when $|\mu_{DCI}-\mu_{DATA}|\leq d_{max}$, wherein a first subcarrier spacing (SCS) of an active bandwidth part (BWP) used for transmission of the DCI in the scheduling cell is $2^{\mu_{DCI}}\cdot 15$ kHz, and wherein a second SCS of an active BWP used for reception of the DL data transmission in the scheduled cell is $2^{\mu_{DATA}}\cdot 15$ KHz.

In Example 16, the subject matter of Examples 14-15 includes, wherein the configuration signaling activates a bandwidth part (BWP) on the scheduled cell when $|\mu_{DCI}-\mu_{DATA}|>d_{max}$.

In Example 17, the subject matter of Example 16 includes, the operations further comprising: decoding the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$; and refraining from changing the BWP on the scheduled cell, while utilizing the BWP for reception of the DL data transmission.

In Example 18, the subject matter of Examples 16-17 includes, the operations further comprising: decoding the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$; switching to a second BWP on the scheduled cell with numerology $\mu_{DATA,2}$ which satisfies $|\mu_{DCI}-\mu_{DATA,2}|\leq d_{max}$; and utilizing the second BWP for reception of the DL data transmission.

Example 19 is a computer-readable storage medium that stores instructions for execution by one or more processors of a base station, the instructions to configure the base station for cross-carrier scheduling of data transmissions in a Fifth Generation New Radio (5G NR) and beyond wireless network, and to cause the base station to perform operations comprising: encoding configuration signaling for transmission to a user equipment (UE), the configuration signaling indicating a first numerology parameter for a scheduling cell of the base station and a second numerology parameter for a scheduled cell of the base station; encoding downlink control information (DCI) for transmission via a physical downlink control channel (PDCCH) of the scheduling cell, the DCI scheduling a downlink (DL) data transmission in the scheduled cell of the base station; and encoding DL data for the DL data transmission via a physical downlink shared channel (PDSCH) of the scheduled cell, when a difference between the first numerology parameter and the second numerology parameter is smaller than or equal to a pre-configured numerology threshold value.

In Example 20, the subject matter of Example 19 includes, wherein the DCI schedules multiple PDSCH transmissions of DL data, and the operations further comprising: decoding a hybrid automatic repeat request acknowledgment (HARQ-ACK) codebook received from the UE, the HARQ-ACK codebook including bundles HARQ-ACK information for the multiple PDSCH transmissions.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a Fifth Generation New Radio (5G NR) network, the apparatus comprising:

processing circuitry, wherein to configure the UE for reporting control information in the 5G NR network, the processing circuitry is to:

decode a downlink control information (DCI) format received from a base station on a physical downlink control channel (PDCCH), the DCI format scheduling a physical downlink shared channel (PDSCH) and including a resource assignment of contiguous physical resource blocks (PRBs), the DCI format further indicating PRB size indicator for PRB bundling;

decode downlink data received from the base station on the contiguous PRBs; and encode a hybrid automatic repeat request acknowledgment (HARQ-ACK) codebook for transmission to the base station on a physical uplink control channel (PUCCH), a payload size of the HARQ-ACK codebook based on a number of occasions for candidate PDSCH reception, an occasion of the occasions associated with one or more start and length indicator values (SLIVs) of a row of a time domain resource allocation (TDRA) table; and memory coupled to the processing circuitry, the memory to store the DCI format.

2. The apparatus of claim 1, wherein the processing circuitry is to:

decode configuration signaling received from a base station, the configuration signaling indicating a first numerology parameter for a scheduling cell of the base station and a second numerology parameter for a scheduled cell of the base station, wherein the DCI schedules the PDSCH in the scheduled cell of the base station;

decode a downlink (DL) data transmission received via the PDSCH) of the scheduled cell, when a difference between the first numerology parameter and the second numerology parameter is smaller than or equal to a pre-configured numerology threshold value; and refrain from decoding the DL data transmission when the difference between the first numerology parameter and the second numerology parameter is greater than the pre-configured numerology threshold value.

3. The apparatus of claim 2, wherein the DCI schedules an uplink (UL) data transmission in the scheduled cell of the base station, and wherein the processing circuitry is configured to:

encode UL data for the UL data transmission via a physical uplink shared channel (PUSCH) of the scheduled cell, when the difference between the first numerology parameter and the second numerology parameter is smaller than or equal to the pre-configured numerology threshold value.

4. The apparatus of claim 3, wherein the processing circuitry is configured to:

refrain from encoding the UL data for the UL data transmission when the difference between the first numerology parameter and the second numerology parameter is greater than the pre-configured numerology threshold value.

5. The apparatus of claim 2, wherein the first numerology parameter is $\mu_{DCI}$, the second numerology parameter is $\mu_{DATA}$, the pre-configured numerology threshold value is $d_{max}$.

6. The apparatus of claim 5, wherein the processing circuitry is configured to decode the DL data transmission when $|\mu_{DCI}-\mu_{DATA}|\leq d_{max}$, wherein a first subcarrier spacing (SCS) of an active bandwidth part (BWP) used for transmission of the DCI in the scheduling cell is $2^{\mu DCI}\cdot 15$ kHz, and wherein a second SCS of an active BWP used for reception of the DL data transmission in the scheduled cell is $2^{\mu DATA}\cdot 15$ KHz.

7. The apparatus of claim 5, wherein the configuration signaling activates a bandwidth part (BWP) on the scheduled cell when $|\mu_{DCI}-\mu_{DATA}|>d_{max}$.

8. The apparatus of claim 7, wherein the processing circuitry is to:

decode the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$; and refrain from changing the BWP on the scheduled cell, while utilizing the BWP for reception of the DL data transmission.

9. The apparatus of claim 7, wherein the processing circuitry is to:

decode the DCI to determine a BWP indicator field, the BWP indicator field indicating the BWP on the scheduled cell is with numerology $\mu_{DATA,1}$ which results in $|\mu_{DCI}-\mu_{DATA,1}|>d_{max}$;

switch to a second BWP on the scheduled cell with numerology $\mu_{DATA,2}$ which satisfies $|\mu_{DCI}-\mu_{DATA,2}|\leq d_{max}$; and utilize the second BWP for reception of the DL data transmission.

10. The apparatus of claim 2, wherein the DCI schedules multiple PDSCH transmissions of DL data, and wherein the processing circuitry is to:

encode a hybrid automatic repeat request acknowledgment (HARQ-ACK) codebook for transmission to the base station, the HARQ-ACK codebook including bundled HARQ-ACK information for the multiple PDSCH transmissions.

11. The apparatus of claim 1, further comprising:

transceiver circuitry coupled to the processing circuitry; and two or more antennas coupled to the transceiver circuitry.

12. A non-transitory computer-readable storage medium that stores instructions for execution by one or more processors of a user equipment (UE), the instructions to configure the UE for reporting control information in a New Radio (NR) network, and to cause the UE to perform operations comprising:

encoding a downlink control information (DCI) format for transmission to the UE on a physical downlink control channel (PDCCH), the DCI format scheduling a physical downlink shared channel (PDSCH) and including a resource assignment of contiguous physical resource blocks (PRBs), the DCI format further indicating PRB size indicator for PRB bundling;

encoding downlink data for transmission to the UE on the contiguous PRBs; and decoding a hybrid automatic repeat request acknowledgment (HARQ-ACK) codebook received from the UE on a physical uplink control channel (PUCCH), a payload size of the HARQ-ACK codebook based on a number of occasions for candidate PDSCH reception, an occasion of the occasions associated with one or more start and length indicator values (SLIVs) of a row of a time domain resource allocation (TDRA) table.

13. A user equipment (UE) configured for operation in a New Radio (NR) network, the UE comprising:

front-end circuitry coupled to one or more antennas; and processing circuitry coupled to the front-end circuitry, the processing circuitry is to:

decode a downlink control information (DCI) format received from a base station on a physical downlink control channel (PDCCH), the DCI format scheduling a physical downlink shared channel (PDSCH) and including a resource assignment of contiguous physical resource blocks (PRBs), the DCI format further indicating PRB size indicator for PRB bundling;

decode downlink data received from the base station on the contiguous PRBs; and encode a hybrid automatic repeat request acknowledgment (HARQ-ACK) codebook for transmission to the base station on a physical uplink control channel (PUCCH), a payload size of the HARQ-ACK codebook based on a number of the contiguous PRBs corresponding to the PRB bundling.

14. The UE of claim 13, wherein the processing circuitry is to:

decode configuration signaling received from a base station, the configuration signaling indicating a first numerology parameter for a scheduling cell of the base station and a second numerology parameter for a scheduled cell of the base station, wherein the DCI schedules the PDSCH in the scheduled cell of the base station;

decode a downlink (DL) data transmission received via the PDSCH) of the scheduled cell, when a difference between the first numerology parameter and the second numerology parameter is smaller than or equal to a pre-configured numerology threshold value; and refrain from decoding the DL data transmission when the difference between the first numerology parameter and the second numerology parameter is greater than the pre-configured numerology threshold value.

15. The UE of claim 14, wherein the DCI schedules an uplink (UL) data transmission in the scheduled cell of the base station, and wherein the processing circuitry is configured to:

encode UL data for the UL data transmission via a physical uplink shared channel (PUSCH) of the scheduled cell, when the difference between the first numerology parameter and the second numerology parameter is smaller than or equal to the pre-configured numerology threshold value.

16. The UE of claim 15, wherein the processing circuitry is configured to:

refrain from encoding the UL data for the UL data transmission when the difference between the first numerology parameter and the second numerology parameter is greater than the pre-configured numerology threshold value.

17. The UE of claim 14, wherein the first numerology parameter is $\mu_{DCI}$, the second numerology parameter is $\mu_{DATA}$, the pre-configured numerology threshold value is $d_{max}$.

* * * * *